(12) United States Patent
Ihara et al.

(10) Patent No.: US 10,645,386 B1
(45) Date of Patent: May 5, 2020

(54) EMBEDDED CODEC CIRCUITRY FOR MULTIPLE RECONSTRUCTION POINTS BASED QUANTIZATION

(71) Applicant: SONY CORPORATION, Tokyo (JP)

(72) Inventors: Toshinori Ihara, Tokyo (JP); Mohammed Golam Sarwer, San Jose, CA (US); Ali Tabatabai, San Jose, CA (US)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/239,021

(22) Filed: Jan. 3, 2019

(51) Int. Cl.
| | | |
|---|---|---|
| *H04N 19/124* | (2014.01) |
| *H04N 19/176* | (2014.01) |
| *H04N 19/182* | (2014.01) |
| *H04N 19/463* | (2014.01) |

(52) U.S. Cl.
CPC ........ *H04N 19/124* (2014.11); *H04N 19/176* (2014.11); *H04N 19/182* (2014.11); *H04N 19/463* (2014.11)

(58) Field of Classification Search
None
See application file for complete search history.

(56) References Cited

U.S. PATENT DOCUMENTS

| | | | |
|---|---|---|---|
| 8,498,335 B2 | 7/2013 | Holcomb et al. | |
| 8,634,668 B2 | 1/2014 | Gharavi-Alkhansari | |
| 8,938,387 B2 | 1/2015 | Hedelin et al. | |
| 9,386,306 B2* | 7/2016 | Tu | H04N 19/176 |
| 2011/0052087 A1* | 3/2011 | Mukherjee | H04N 19/46 382/248 |
| 2012/0287989 A1* | 11/2012 | Budagavi | G06F 17/147 375/240.03 |
| 2015/0026747 A1* | 1/2015 | Au | H04N 21/23439 725/116 |
| 2015/0229926 A1* | 8/2015 | Puri | H04N 19/61 375/240.02 |

FOREIGN PATENT DOCUMENTS

| | | |
|---|---|---|
| EP | 2157798 A1 | 2/2010 |
| WO | 201/1107434 A1 | 9/2011 |

* cited by examiner

*Primary Examiner* — Talha M Nawaz
(74) *Attorney, Agent, or Firm* — Chip Law Group

(57) ABSTRACT

An embedded codec (EBC) circuitry includes encoder circuitry to encode an image block by application of a sequential encoding scheme to generate an encoded image block. The encoder circuitry determines a local pixel value of each pixel of the plurality of pixels in the encoded image block, based on a quantization bin size of each pixel in the encoded image block. The encoder circuitry selects a reconstruction point from a plurality of reconstruction points based on an accumulated difference of the local pixel value and an input pixel value of each pixel in the encoded image block. The encoder circuitry allocates a set of signaling bits that indicates the selected reconstruction point in a bit-stream of the encoded image block. The EBC circuitry further includes decoder circuitry to reconstruct the input pixel value of each pixel in the encoded image block, based on the set of signaling bits.

20 Claims, 10 Drawing Sheets

EMBEDDED CODEC CIRCUITRY FOR MULTIPLE RECONSTRUCTION POINTS BASED QUANTIZATION

CROSS-REFERENCE TO RELATED APPLICATIONS/INCORPORATION BY REFERENCE

None.

FIELD

Various embodiments of the disclosure relate to an embedded codec for image and video compression or decompression. More specifically, various embodiments of the disclosure relate to embedded codec circuitry for multiple reconstruction points based quantization.

BACKGROUND

With recent advancements in imaging technologies, there is an increasing demand for on-chip codecs in image capturing and display devices that can handle compression and storage of different images or video in wide variety of image resolutions (e.g., low to high resolution images/video). Currently, an image or video may be subjected to multiple coding techniques, for example, transform coding, residual prediction, quantization, entropy coding, refinement, and the like, to achieve a desired compression. Typically, at decoding stage, a middle value of a quantization bin is utilized to decode the encoded image or video. In certain scenarios, the input pixel values in different image blocks of the image or video may lie in different numeric ranges within a quantization bin. For example, for a quantization bin of "0-31" bin size, the pixel values may be in a numeric range of "0-10" in one image block and "20-31" in another image block. In such scenarios, the reconstruction of each image block of the encoded image or video in accordance with the middle value of the quantization bin may significantly increase the quantization error due to a large difference in reconstructed value and input pixel value. This may not only result in visible image artifacts, but may also lead to compression inefficiency and sub-optimal memory usage, especially in on-chip codes where it is desirable to achieve an area efficiency with respect to throughput while minimizing an on-chip memory usage.

Further limitations and disadvantages of conventional and traditional approaches will become apparent to one skill in the art, through comparison of described systems with some aspects of the present disclosure, as set forth in the remainder of the present application and with reference to the drawings.

SUMMARY

An embedded codec (EBC) circuitry and a method for multiple reconstruction points based quantization are provided, substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
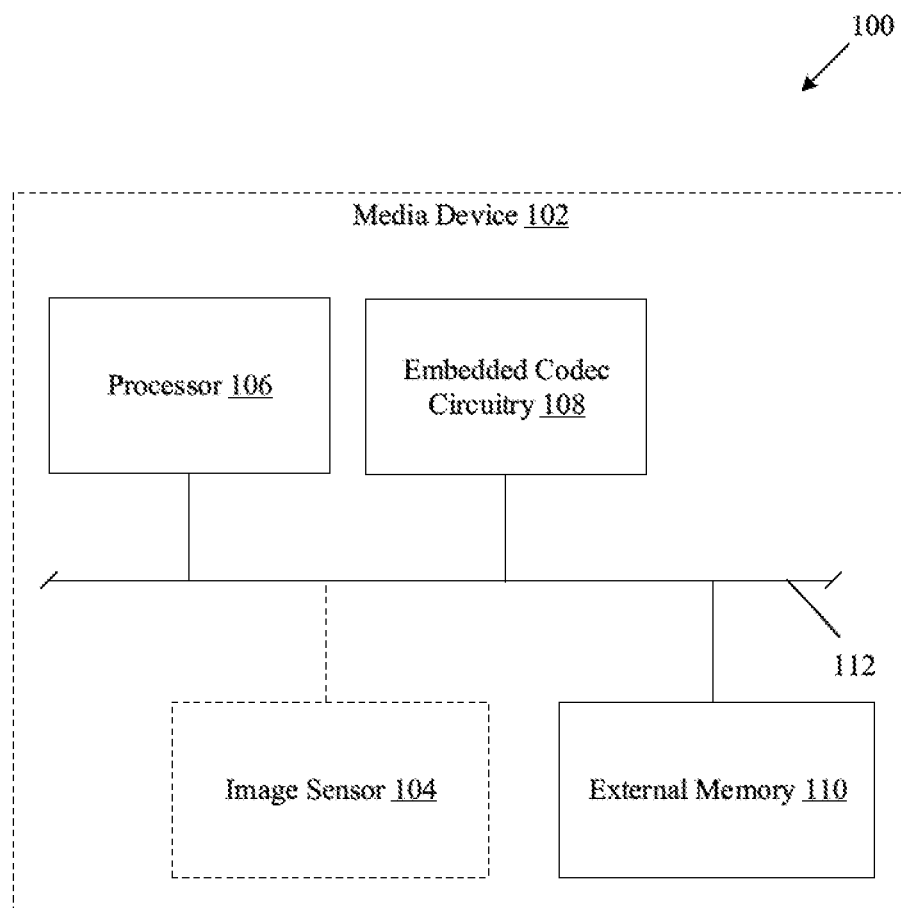
FIG. 1 is a block diagram that illustrates an exemplary media device having circuitry that includes embedded codec (EBC) circuitry for multiple reconstruction points based quantization, in accordance with an embodiment of the disclosure.

Various embodiments of the present disclosure may be found in a method and embedded codec (EBC) circuitry for multiple reconstruction points based quantization. The EBC circuitry may include encoder circuitry that handles generation of encoded bit-stream of a one-dimensional (1D) image block. The disclosed EBC circuitry encodes the 1D image block to generate an encoded 1D image block, which include pulse code modulation (PCM) coded bits, differential PCM (DPCM) coded bits, refinement bits, and un-coded bits in bit-planes. The number of bit-planes may be defined prior to encoding operation, as a defined bit-depth. The disclosed EBC circuitry determines a pixel value for each pixel of a plurality of pixels in the 1D image block based on a quantization bin size of a corresponding quantization bin that includes the pixel value. The quantization bin size may be determined based on a count of the bit-planes that comprises the un-coded bits. For example, an encoded 1D image block may include un-coded bits corresponding to a pixel, in 4 bit-planes. The quantization bin size for the pixel may be determined as $2^4$ (i.e. 16). The disclosed EBC circuitry selects a reconstruction point from a plurality of reconstruction points for each encoded 1D image block based on quantization error between the determined pixel value and input pixel value corresponding to decimal equivalent of un-coded bits of each pixel of the plurality of pixels. The reconstruction point corresponds to a reference value (or normalized value), which decides a reconstruction value of a quantization bin. The quantization bin comprises a range of pixel values, and a value from the range of pixel values may be selected as the reconstruction value corresponding to a particular quantization bin based on the reconstruction point. The reconstruction point may vary for different 1D image blocks. The EBC circuitry may further include decoder circuitry that handles reconstruction of each encoded 1D image block from the encoded bit-stream of the 1D image block in accordance with the reconstruction point selected for each encoded 1D image block. The majority of the input pixel values of the encoded 1D image block may lie around the reconstruction value corresponding to the reconstruction point. The reconstruction of the encoded bit-stream about the corresponding reconstruction value improves the image quality as the overall quantization error may be significantly reduced. As a result of the reconstruction of the encoded bit-stream based on the selected reconstruction point at the block level, compression efficiency is significantly improved without an adverse impact on quality of encoded image. Further, an area efficiency with respect to throughput of the disclosed EBC circuitry is enhanced and an on-chip memory usage is optimized.

In conventional image compression techniques, a single reconstruction point (or predetermined reconstruction point) is typically used for each 1D image block corresponding to an image. The reconstruction point (generally, a middle reconstruction point of quantization bin) utilized for reconstruction is similar for all the 1D image blocks, without considering the distribution of the values of the plurality of pixels. In a 1D image block, in which a difference between the pixel values and the reconstruction point is higher as compared to other 1D image blocks, the quantization error significantly increases. As a result, the overall image quality is deteriorated. Thus, a method is provided in which a reconstruction point may be selected for each 1D image block based on distribution of pixel values such that the quantization error may be significantly reduced.

The disclosed EBC circuitry selects a reconstruction point from a plurality of reconstruction points for each 1D image block based on the quantization error between input pixel values and locally decoded pixel values. The plurality of reconstruction points may be normalized values specified prior to encoding operation. The locally decoded pixel values may be determined based on the conventional middle reconstruction point. The selected reconstruction point for each 1D image block may be an optimal reconstruction point that minimizes the overall quantization error. Therefore, as a result of such selection of the reconstruction point, the overall image quality is significantly improved.

FIG. 1 is a block diagram that illustrates an exemplary media device having circuitry that includes embedded codec (EBC) circuitry for multiple reconstruction points based quantization, in accordance with an embodiment of the disclosure. With reference to FIG. 1, there is shown a media device 102 that includes a processor 106, an embedded codec (EBC) circuitry 108, and an external memory 110. In some embodiments, an image sensor 104 may be communicatively coupled to the processor 106, the EBC circuitry 108, and the external memory 110. There is further shown a system bus 112 that interconnects the image sensor 104, the processor 106, the EBC circuitry 108, and the external memory 110.

The media device 102 may comprise suitable logic, circuitry, and interfaces that may be configured to store uncompressed raw images and/or videos as encoded (i.e. compressed) images and/or videos in the external memory 110. The media device 102 may be further configured to manage encoding as well as decoding of media content (for example, encoded images and/or videos) and further playback of the decoded media content at the media device 102. The media device 102 may include a dedicated on-chip codec (such as the EBC circuitry 108) for an offline (without the need for Internet/network) processing and compression/decompression of images/video. In some embodiments, the media device 102 may also include one or more image sensors (such as the image sensor 104) to capture images in a raw image file format, which is an uncompressed file format. In such cases, the captured image may be encoded by the EBC circuitry 108 of the media device 102. Examples of the media device 102 may include, but are not limited to, a digital camera, a portable communication device (e.g. laptops, smartphones, tablets, phablets, smart watches, smart glasses, etc.), a media server, a workstation, a desktop computer, and augmented reality/Virtual Reality/Mixed Reality (AR/VR/MR) devices.

Although not shown in FIG. 1, the media device 102 may also include a network interface that may be configured to manage sharing of encoded and/or raw uncompressed images and/or videos with other peripheral or peer-connected devices, through a communication network (also not shown). The detailed description of the network interface and the communication network has been omitted from the present disclosure for the sake of brevity.

The image sensor 104 may comprise suitable logic, circuitry, and interfaces that may be configured to capture a raw uncompressed image or a sequence of raw uncompressed images of a scene in a field-of-view (FOV) of the image sensor 104. The image sensor 104 may be implemented as an active pixel sensor, such as a complementary-metal-oxide semiconductor (CMOS) sensor. In such implementation, the image sensor 104 may be configured to execute progressive scan (line-by-line) of each row or column of pixels (one dimensional (1D) pixel-array or 1D image block) on a sensor core of the CMOS sensor. The progressive scan may be a vertical scan (column wise) or a horizontal scan (row wise). In some embodiments, instead of an active pixel sensor, the image sensor 104 may be implemented as one of a passive pixel sensor (such as a charged coupled device (CCD) sensor, an oversampled binary image sensor, a planar Fourier capture array (PFCA), a back-illuminated (BSI or BI) sensor, and the like. Although not shown, the image sensor 104 may also include a specialized microprocessor (or a microcontroller) that is configured to operate in accordance with image data from the image sensor 104, a graphic processing unit (GPU) to process images stored in a frame buffer, and/or a memory integrated with the image sensor 104.

The processor 106 may comprise suitable logic, circuitry, and interfaces that may be configured to execute a set of instructions stored in a dedicated memory (e.g., the external memory 110 or an on-chip memory in the EBC circuitry 108). The processor 106 may be implemented based on a number of processor technologies known in the art. Examples of the processor 106 may include, but are not limited to, a Graphical Processing Unit (GPU), a co-processor (such as a specialized image co-processor) for a processor, a specialized digital signal processor, a Central Processing Unit (CPU), an x86-based processor, an x64-based processor, a Reduced Instruction Set Computing (RISC) processor, an Application-Specific Integrated Circuit (ASIC) processor, a Complex Instruction Set Computing (CISC) processor.

The EBC circuitry 108 may comprise suitable logic, circuitry, and interfaces that may be configured to encode a 1D image block (e.g., a 16×1 or an 8×1 image block) as per a specific compression factor. The EBC circuitry 108 may be further configured to select a reconstruction point of a plurality of reconstruction points, for the encoded 1D image block, in response to instructions received at the EBC circuitry 108. In some embodiments, the 1D image block may be part of an input image (i.e. a raw uncompressed image) or a pixel array (row or column) retrieved directly from a read out register of the image sensor 104, following a row-wise or a column-wise scan by the image sensor 104. The EBC circuitry 108 may further manage storage of a bit-stream of encoded 1D image block in the external memory 110 or may manage transfer of the bit-stream of encoded 1D image to other media devices via dedicated communication networks. It may be noted that the implementation of the disclosed EBC circuitry is not limited to 1D image blocks. Accordingly, in some embodiments, 2D image blocks may also be encoded by the BC circuitry 108, without a deviation from the scope of the discourse.

The EBC circuitry 108 may comprise suitable logic, circuitry, and interfaces that may be configured to decode the encoded 1D image block in accordance with header information associated with the encoded 1D image block. The EBC circuitry 108 may be further configured to reconstruct the pixel value of each pixel in accordance with the selected reconstruction point of the plurality of reconstruction points. The EBC circuitry 108 may further manage display of the decoded image at a display of the media device 102.

The EBC circuitry 108 may be implemented as a specialized hardware encoder/decoder interfaced with the other computational circuitries of the media device 102. In such implementation, the EBC circuitry 108 may be associated with a specific form factor on a specific computational circuitry. Examples of the specific computational circuitry may include, but are not limited to, a field programmable gate array (FPGA), programmable logic devices (PLDs), an application specific integrated circuit (ASIC), a programmable ASIC (PL-ASIC), application specific integrated parts (ASSPs), and a System-on-Chip (SOC) based on standard microprocessors (MPUs) or digital signal processors (DSPs). In accordance with another embodiment, the EBC circuitry 108 may also interface with a graphical processing unit (GPU) to parallelize operations of the EBC circuitry 108. In accordance with yet another embodiment, the EBC circuitry 108 may be implemented as a combination of programmable instructions stored in a memory and logical units (or programmable logic units) on a hardware circuitry of the media device 102.

The external memory 110 may comprise suitable logic, circuitry, and interfaces that may be configured to store an input image (uncompressed raw or encoded) or a sequence of input images. The external memory 110 may be further configured to act as an image buffer to store raw uncompressed 1D image blocks retrieved directly from the image sensor 104. Additionally, the external memory 110 may store instructions associated with sequential encoding/decoding schemes that may be applied, by the EBC circuitry 108, to generate a bit-stream of encoded 1D image block. In an exemplary embodiment, the external memory 110 may be a persistent storage memory or a dynamic random access memory (DRAM) that may be externally interfaced with the EBC circuitry 108. In another exemplary embodiment, the external memory 110 may be static random access memory (SRAM) circuits that may be externally interfaced with the EBC circuitry 108. Further examples of implementation of the external memory 110 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, or a Secure Digital (SD) card.

In some embodiments, the EBC circuitry 108 may also provide support (e.g., a backward compatibility) for other different codec standards that may include, for example, Advanced Video Codec (AVC)/Media Experts Group (MPEG-4/AVC) or H.264, MPEG-4/HEVC or H.265, and the like. Additionally, the video codec may be supported by other codec libraries that may include FFmpeg, Xvid, DIVx, VP1-9, Windows Media Codec, FFays (fast forwarding or transcoding every video format to AVS format), and the like.

The system bus 112 may be a hardware bus that may include a set of data channels (or conductive paths) to different components of the media device 102. Alternatively stated, the system bus 112 may interconnect at least data ports, address ports, and control signal ports of different components of the media device 102. For example, the system bus 112 may interconnect the image sensor 104, the processor 106, the EBC circuitry 108, the external memory 110, and other circuitries to each other. The system bus 112 may be configured to facilitate a serial data communication or parallelized data communication between different components on-board the media device 102. Examples of the system bus 112 may include an 8-bit parallel single system bus, a 16-bit parallel single system bus, a 32-bit parallel single system bus, a 64-bit parallel single system bus, a serial data bus, and the like.

In operation, a 1D image block or a sequence of 1D image blocks may be received by the media device 102. In some embodiments, the 1D image block or the sequence of 1D image blocks may be retrieved directly from a read-out register of an on-chip image sensor (such as the image sensor 104) or a camera device interfaced with the media device 102. In other embodiments, the 1D image block or the sequence of 1D image blocks may be retrieved from an uncompressed raw input image stored in a persistent storage, such as the external memory 110, of the media device 102 or received externally from other media storage devices, such as cameras, data servers, etc. The operations in FIG. 1 are explained by taking an example of a 1D image block. However, the scope of the disclosure may not be limited to the 1D image block, and that a 2D image or a video, may be processed similar to the operations applied on the 1D image block.

The EBC circuitry 108 may be configured to retrieve the 1D image block or the sequence of 1D image blocks from the external memory 110 or directly from the read out register of the image sensor 104. The EBC circuitry 108 may be configured to execute a sequential encoding scheme on the 1D image block to generate a bit-stream of encoded 1D image block. The bit-stream of encoded 1D image block may include header information that may indicate the sequential encoding scheme applied at encoding of the 1D image block, to obtain the bit-stream of encoded 1D image block. In one implementation, the sequential encoding scheme may include a sequential application of quantization followed by a residual prediction, and a refinement scheme. In other implementation, the sequential encoding scheme may include a sequential application of a 1D transform, followed by quantization, a residual prediction, an entropy coding, and a refinement scheme.

In a sequential encoding scheme, the EBC circuitry 108 may be configured to quantize a plurality of input pixel values for each 1D image block to generate a plurality of quantized levels. The plurality of quantized levels may be separated from each other by a plurality of discretized quantization bins. A step size for the plurality of quantization bins may be further selected adaptively or uniformly to efficiently quantize a 1D image block of input pixel values into a plurality of quantized levels. In adaptive selection, the step size may be different for different 1D image blocks based on distribution of input pixel values. In uniform selection, the step size may be equal for each 1D image block. Each quantized level may be a mid-value from an upper bound and a lower bound of a quantization bin, for example, a quantization bin of "(155,175)" may include a quantized-transformed level of "(155+175)/2", i.e. "165". With quantization, the EBC circuitry 108 may remove redundant coefficient information from transform domain data (i.e. the plurality of transform coefficients) without a visually noticeable degradation of quality.

The plurality of quantization bins may be determined based on a quantization parameter (QP), which may vary in accordance with an adaptive quantization scheme to encode or decode the media content. The QP may vary from 0 to a bit depth of a bit-stream of encoded 1D image block. For example, a QP for an 8-bit bit-stream of compressed 1D image block may be selected as "5" for a first 1D image block and "4" for a second 1D image block. This may indicate that the second 1D image block may be quantized with a finer step size as compared to the first 1D image block (e.g., a step size of 16 for the second 1D image block is less as compared to a step size of 32 for the first 1D image block). In certain embodiments, a quantization scheme that is implemented on the plurality of pixel values in each 1D image block is a bit-plane quantization scheme.

The EBC circuitry 108 may be further configured to apply a residual prediction scheme on each 1D image block of quantized levels, where each 1D image block may include a plurality of quantized levels. Examples of the residual prediction scheme may include, but are not limited to, a Pulse Coded Modulation (PCM) scheme, a Differential Pulse Code Modulation (DPCM) scheme, or an Adaptive DPCM (ADPCM) scheme. After application of the residual prediction scheme, a 1D image block of quantized residual levels may be obtained from each 1D image block of quantized levels. The 1D image block of quantized residual levels may be stored in a memory, such as the external memory 110 or an on-chip memory (e.g., a dedicated SRAM or an on-chip cache) in the EBC circuitry 108.

The EBC circuitry 108 may be further configured to encode each 1D image block of quantized residual levels to generate the encoded 1D image block of defined bit-depth. The defined bit-depth may be specified prior to encoding operation and may correspond to a total count of a plurality of bit-planes in the encoded 1D image block. The plurality of bit-planes may include coded bits (e.g., DPCM coded bits and PCM coded bits) as well as un-coded bit-positions. In accordance with an embodiment, the EBC circuitry 108 may be further configured to encode each 1D image block of quantized residual levels by application of an entropy coding scheme. The entropy coding scheme may include, but is not limited to, a Huffman coding scheme, an exponential Golomb coding scheme, a progressive Golomb coding scheme, a Golomb-Rice coding scheme, and a combination of the Huffman coding scheme and the exponential Golomb coding scheme.

The EBC circuitry 108 may be further configured to refine the encoded 1D image block by allocation of refinement bits at un-coded bit positions in accordance with a refinement budget and a refinement order. The refinement budget may be determined based on a total bit-budget and a count of coded bits in the encoded 1D image block. The refinement order may be, but is not limited to, a boundary to center refinement order, a left to right refinement order, or a right to left refinement order. After allocation of the refinement bits, the encoded 1D image block may further include refinement bits in addition to the coded bits. The encoded 1D image block may include the un-coded bits in bit-planes of the plurality of bit-planes corresponding to the defined bit-depth. The count of bit-planes, which include the un-coded bits, may define a quantization bin parameter (Qn) of the corresponding pixel in the 1D image block. For example, the encoded 1D image block include un-coded bits in '4' least significant bit-planes and '5' least significant bit-planes for a first pixel and a second pixel respectively. Then, the Qn for the first pixel and the second pixel are '4' and '5' respectively.

The EBC circuitry 108 may be further configured to select a reconstruction point from a plurality of reconstruction points based on a quantization bin size of each pixel of the encoded 1D image block. The quantization bin size may be determined based on the Qn value of each pixel. For example, for the Qn value of 4, the quantization bin size may be determined as $2^4$ i.e., 16. The EBC circuitry 108 may be further configured to allocate signaling bits for the selected reconstruction point for reconstruction of the encoded 1D image block at decoding stage.

In accordance with an embodiment, the EBC circuitry 108 may be configured to generate the bit-stream of encoded 1D image block, which may include the header information and the signaling bits. An EBC decoder circuit (not shown in FIG. 1) of the EBC circuitry 108 may pre-store different coding tables (e.g., custom coding tables for Huffman encoding schemes, Exponential-Golomb encoding schemes, or signaling bit tables) and quantization tables. The EBC decoder circuit may be configured to decode the bit-stream of encoded 1D image block based on the header information. The EBC decoder circuit may be further configured to reconstruct the pixel values in decoded 1D image block in accordance with the reconstruction point indicated by the signaling bits.

In accordance with another embodiment, the EBC circuitry 108 may be configured to generate the bit-stream of encoded 1D image block such that the bit-stream may be decodable by different external decoders that may utilize different decoding schemes to decode the bit-stream of encoded 1D image block. In such a case, the EBC circuitry 108 may be configured to add different coding tables (e.g., custom coding tables for Huffman encoding schemes, Exponential-Golomb encoding schemes, or signaling bit tables) and quantization tables, in the header information or a different meta-stream associated with the bit-stream of encoded 1D image block. By addition of such custom tables and quantization tables in the bit-stream, the output of the EBC circuitry 108 may be decodable by other decoder circuitries. In certain scenarios, the different coding tables may be pre-stored at the external decoders. In such scenarios, it may not be required to add different coding tables in the header information or a different meta-stream associated with the bit-stream of encoded 1D image block.

In accordance with an embodiment, the bit-stream of encoded 1D image block may be stored as part of an input image (such as a 2D image), a complete image, or a video portion, in the memory, such as the external memory 110 or an on-chip memory in the EBC circuitry 108. In one implementation, the processor 106 may be configured to transfer the bit-stream of encoded 1D image block, via the system bus 112, to a frame buffer (or a frame store) of a display circuitry (e.g., a video card) communicatively interfaced with the system bus 112 of the media device 102. The frame buffer may act as a compressed frame buffer for the display circuitry. The display circuitry (not shown in FIG. 1) may decode and further utilize the bit-stream of encoded bit-stream of 1D image block to display a patch of image at the media device 102. In another implementation, the processor 106 may be configured to transfer the bit-stream of encoded 1D image block, via the system bus 112, to a decoder buffer, such as a decoder picture buffer (DPB) of a video decoder, a buffer memory for an image decoder, or a coded picture buffer (CPB) of a video codec, in the media device 102.

Figure 2A:
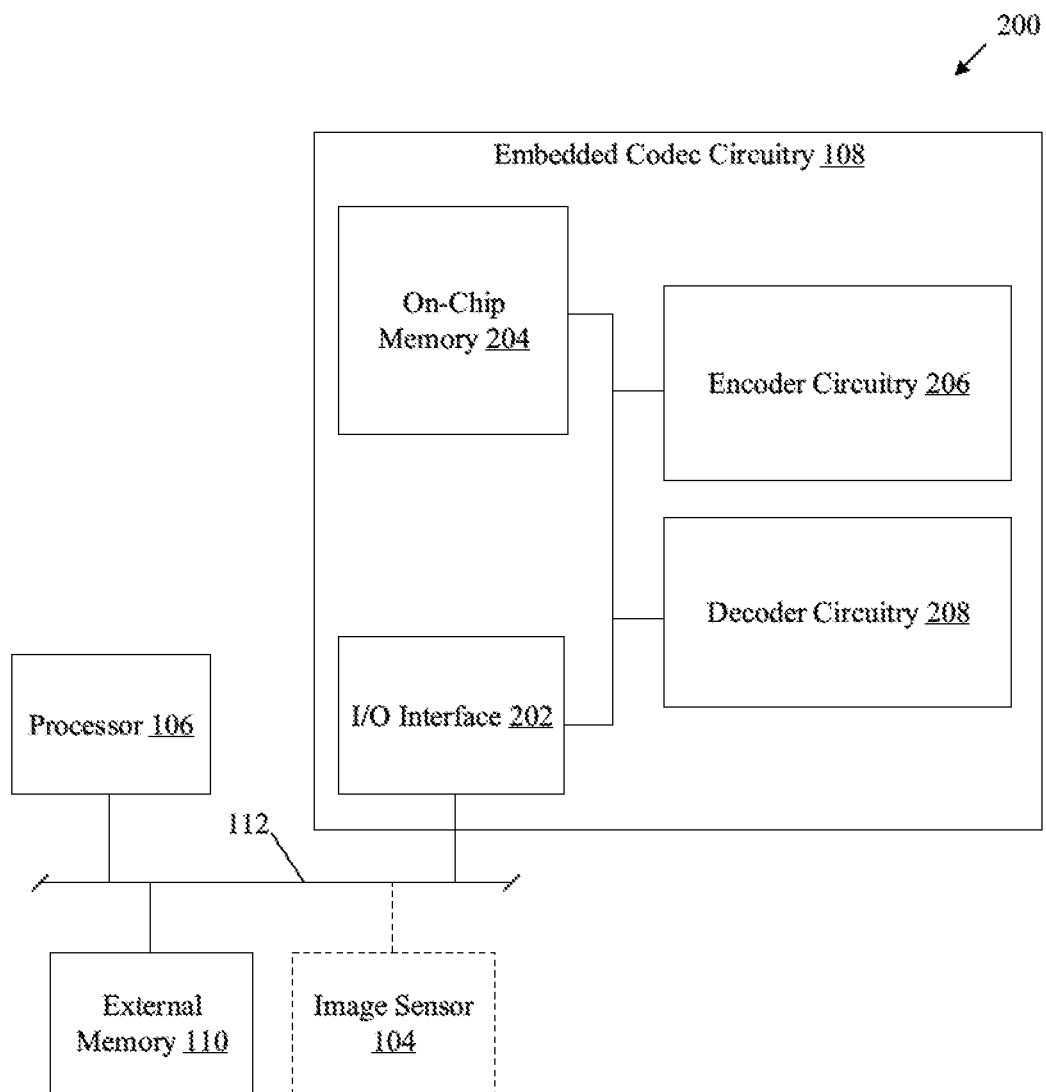
FIG. 2A is a block diagram that illustrates the EBC circuitry of FIG. 1 with various peripheral components for multiple reconstruction points based quantization, in accordance with an embodiment of the disclosure.

In an exemplary implementation, the media device 102 may be a camera, such as a digital video camera or a digital image camera, and the bit-stream of encoded 1D image block may correspond to a 1D array of pixel values that are directly received from a read-out register of a CMOS sensor in the camera. In an exemplary embodiment, the EBC circuitry 108 may be implemented in the CMOS sensor circuitry. FIG. 2A is a block diagram that illustrates an embedded codec (EBC) circuitry with various peripheral components for multiple reconstruction points based quantization, in accordance with an embodiment of the disclosure. FIG. 2A is explained in conjunction with elements from FIG. 1. With reference to FIG. 2A, there is shown a block diagram 200 of the EBC circuitry 108. The EBC circuitry 108 may include an Input/output (I/O) interface 202, an on-chip memory 204, an encoder circuitry 206, and a decoder circuitry 208. In the block diagram 200, there is also shown the image sensor 104, the processor 106, and the external memory 110 communicatively coupled to the EBC circuitry 108, via the system bus 112. In some embodiments, the processor 106 and the external memory 110 may be implemented inside the EBC circuitry 108, without a deviation from the scope of the disclosure.

The I/O interface 202 may comprise suitable logic, circuitry, and interfaces that may be configured to manage a plurality of I/O ports to facilitate exchange of communication data from other peripheral circuitries, via the system bus 112, for example, the external memory 110, the processor 106, or the image sensor 104. The communication data may include a bit-stream of the encoded 1D image block, control signals, CPU instructions, and the like. The configuration of the I/O ports may depend on a specification of the EBC circuitry 108, for example, physical I/O pins in an ASIC, FPGA or a SoC chip.

The on-chip memory 204 may comprise suitable logic, circuitry, and interfaces that may be configured to store different operational data (e.g., transform domain data, residual levels, quantization levels, entropy coded bits, etc.) that may be utilized by different components of the EBC circuitry 108 to encode the 1D image block. Examples of the operational data stored in the on-chip memory 204 may include, but are not limited to, a bit-stream of encoded 1D image block, transform-domain data, quantized-transformed levels, quantized-transformed residual levels, computed variables, and temporary processing data, and 1D/2D image blocks. The on-chip memory 204 may be implemented as a specific memory designed with a defined memory specification, such as a read/write speed, a memory size, fabrication factors, and the like. Examples of the on-chip memory 204 may include, but are not limited to, static random access memory (SRAM), dynamic access memory (DRAM), and Static Dynamic RAM (SD-RAM).

The encoder circuitry 206 may comprise suitable logic, circuitry, and interfaces that may be configured to generate a bit-stream of encoded 1D image block by application of a sequential encoding scheme on a 1D image block and followed by refinement of the encoded 1D image block. The encoder circuitry 206 may also select a reconstruction of a plurality of reconstruction points based on a quantization bin size corresponding to each pixel of the encoded 1D image block. The encoder circuitry 206 may allocate signaling bits in the bit-stream of encoded 1D image block for the selected reconstruction point. The reconstruction point may be selected such that the maximum pixel values lie around the selected reconstruction, which improves the overall subjective image quality as a quantization error between actual pixel values and reconstructed pixel values is significantly reduced. In some embodiments, the encoder circuitry 206 may be a hardware encoder chip that may be implemented based on one of ASIC, programmable logic devices (PLDs), SOC, FPGA, digital signal processors (DSPs) or other specialized circuitries. In other embodiments, the encoder circuitry 206 may be implemented as a combination of hardware and stored set of instructions in the on-chip memory 204 (for example, instructions based on VHDL or HDL logic).

The decoder circuitry 208 may comprise suitable logic, circuitry, and interfaces that may be configured to decode a bit-stream of encoded 1D image block by application of a sequential decoding scheme based on header information that includes the signaling bits. In one implementation, the sequential decoding scheme may include sequential application of an inverse quantization, followed by a residual prediction decoding, and a refinement decoding on the bit-stream of encoded 1D image block. The decoder circuitry 208 may also reconstruct the pixel values of each pixel in the encoded 1D image block based on the reconstruction point indicated by the signaling bits. In some embodiments, the decoder circuitry 208 may have pre-stored quantization tables and coding tables that may act as a reference for the decoder circuitry 208 to decode the bit-stream of encoded 1D image block. In some embodiments, the decoder circuitry 208 may be a hardware encoder chip that may be implemented based on one of ASIC, programmable logic devices (PLDs), SOC, FPGA, digital signal processors (DSPs) or other specialized circuitries. In some embodiments, the decoder circuitry 208 may be implemented as a combination of hardware and programmed instructions in the on-chip memory 204 (for example, instructions based on VHDL or HDL logic).

Figure 2B:
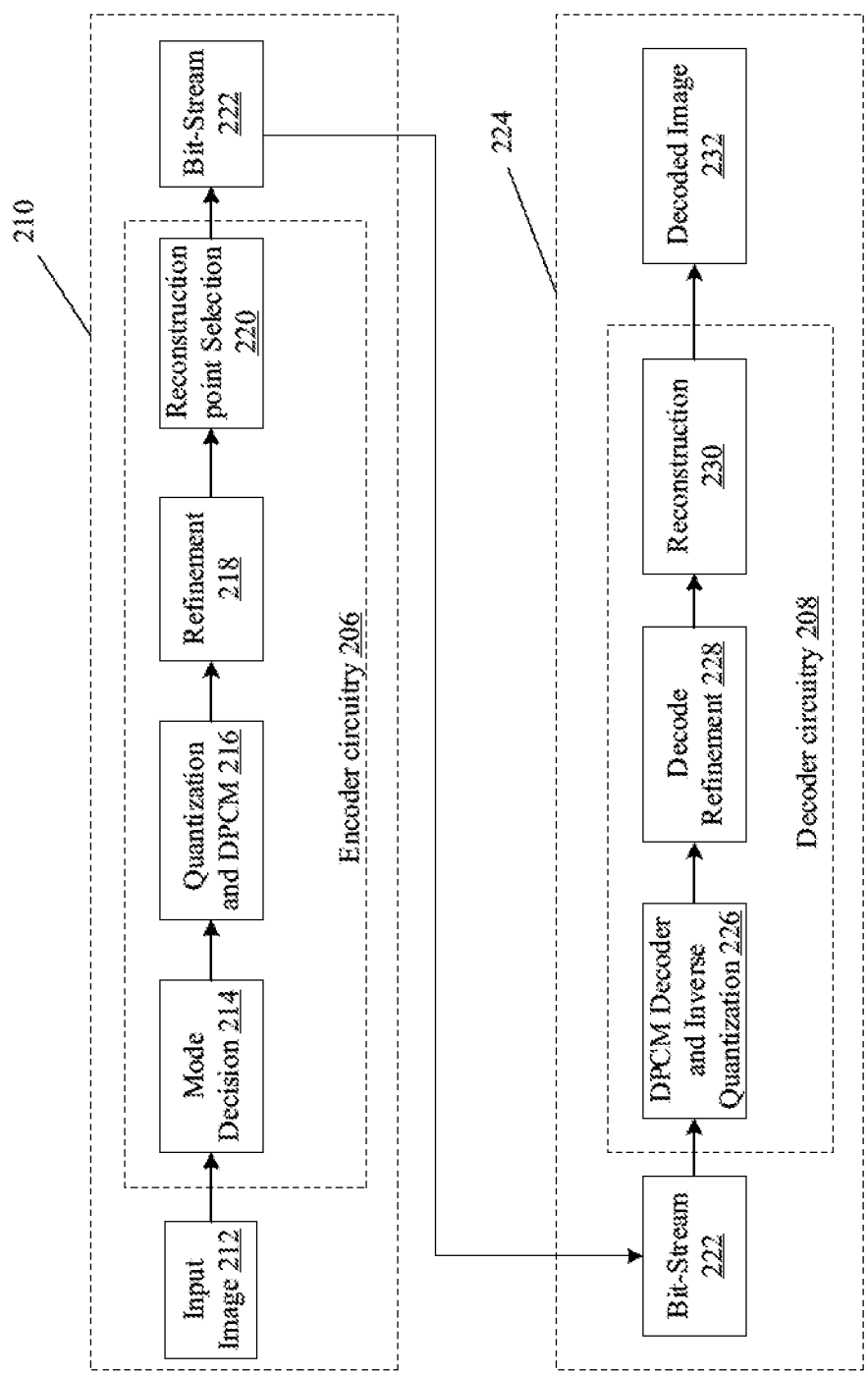
FIG. 2B illustrates operation in the encoder circuitry and the decoder circuitry of FIG. 2A for multiple reconstruction points based quantization, in accordance with an embodiment of the disclosure.

FIG. 2B illustrates operation in the encoder circuitry and the decoder circuitry of FIG. 2A for multiple reconstruction points based quantization, in accordance with an embodiment of the disclosure. FIG. 2B is explained in conjunction with elements from FIG. 1 and FIG. 2A. With reference to FIG. 2B, there is shown a first sequence of operations 210 at encoding side and a second sequence of operations 224 at the decoding side.

In operation, a plurality of 1D image blocks corresponding to an input image 212 (or a sequence of images/video) may be stored in the memory, such as the external memory 110 or the on-chip memory 204. The encoder circuitry 206 may be configured to receive the plurality of 1D image blocks corresponding to the input image 212 from the memory.

In the first sequence of operations 210 at the encoding side, at 214, a mode of sequential encoding scheme may be decided. The mode may correspond to a sequence of different encoding operations to be applied on the plurality of 1D image blocks corresponding to the input image 212. For example, one mode may correspond to quantization followed by residual prediction, and another mode may correspond to transform coding, followed by quantization and residual prediction. In some embodiments, the mode of the sequential encoding scheme may be determined based on application specific requirements, such as compression ratio requirement, random access requirement, latency requirement, image data etc. After mode decision, the plurality of 1D image blocks may be encoded in accordance with the sequential encoding scheme indicated by the decided mode.

At 216, the sequential encoding scheme may be executed on the plurality of 1D image blocks to generate an encoded 1D image block corresponding to each 1D image block. The encoder circuitry 206 may be further configured to execute the sequential encoding scheme on each 1D image block to generate an encoded 1D image block. The sequential encoding scheme may be, but is not limited to, a sequential application of a quantization and followed by a residual prediction on each 1D image block. The quantization may be a bit-plane quantization for a quantization parameter of "7", and the residual prediction may be a DPCM coding scheme. The execution of the sequential encoding scheme may result in the generation of the encoded 1D image block corresponding to each 1D image block, which include coded bits in a first plurality of bit-planes (for e.g., coded bits in '7' most significant bit-planes of defined bit-depth of 16 bit-planes), and un-coded bits in a second plurality of bit-planes (for e.g., un-coded bits in '9' least significant bit-planes of defined bit-depth of 16 bit-planes).

At 218, due to availability of refinement bit-budget, some of the un-coded bit-positions may be allocated with the refinement bits in the second plurality of bit-planes. The encoder circuitry 206 may be further configured to allocate the refinement bits in accordance with the available refinement bit-budget. After refinement, a count of the second plurality of bit-planes, which include un-coded bit-positions, may be reduced. Different pixels may include different count of un-coded bits, or in other words, the count of second plurality of bit-planes may vary from pixel to pixel, based on a count of refinement bits allocated for a particular pixel.

The count of second plurality of bit-planes corresponding to each pixel in the encode 1D image block may correspond to a quantization bin parameter (Qn) of each pixel. In other words, a count of un-coded bits corresponding to each pixel may be equal to the Qn of the pixel. In accordance with an embodiment, the encoder circuitry 206 may be further configured to determine whether a maximum value of the Qn in the encoded 1D image block is greater than a threshold value or not. The threshold value may be specified based on prior experimentations and/or a user input, and may be any value between 0 to bit-depth. In case it is determined that the maximum value of the Qn in the encoded 1D image block is greater than the threshold value, the encoder circuitry 206 may be further configured to utilize the plurality of reconstruction points for reconstruction at the decoding stage. Otherwise, the encoder circuitry 206 may be configured to utilize a single reconstruction point for the reconstruction at the decoding stage.

Different 1D image blocks may have different range of input pixel values. Accordingly, a reconstruction point suitable for one 1D image block may not be suitable for other 1D image block. Thus, it may be desirable to have a method for selection of a reconstruction point for each 1D image block. A plurality of quantization bins may be defined as different range of values, based on a quantization parameter (QP). For example, a quantization bin for QP equal to '5' may be determined as (0-31). According to a middle reconstruction technique, the reconstruction point corresponding to this quantization bin may be 16. The 1D image block in which the input pixel values may be in a range of 6 to 8 and may be reconstructed using the middle reconstruction point of '16', may have very high quantization error as compared to a case in which the reconstruction point may be selected as '7'. Therefore, the middle reconstruction point based reconstruction of the encoded 1D image block may adversely affect the image quality of decoded image.

At 220, a reconstruction point of the plurality of reconstruction points may be selected for each encoded 1D image block. The encoder circuitry 206 may be configured to select a reconstruction point from a plurality of reconstruction points for each encoded 1D image block. The reconstruction point may be selected based on the quantization bin size corresponding to un-coded bits in each pixel of the encoded 1D image block. The selected reconstruction point may be an optimal reconstruction point of the plurality of reconstruction points, which minimizes the quantization error and improves the subjective image quality. The plurality of reconstruction points may be specified prior to encoding operation. For example, '4' reconstruction points may be specified for reconstruction (such as 0.125, 0.375, 0.625, and 0.875). The pixel value reconstructed based on the reconstruction point may be equal to multiplication of the reconstruction point and the quantization bin size. For example, for the reconstruction point of 0.125 and the quantization bin size of 32, the reconstructed pixel value may be "0.125×32" i.e., 4.

In order to select the reconstruction point, the encoder circuitry 206 may be configured to determine a first pixel value corresponding to un-coded bits of each pixel in the encoded 1D image block. The first pixel value may be a decimal equivalent of the un-coded bits. The encoder circuitry 206 may be further configured to determine a quantization bin parameter (Qn) corresponding to each pixel based on a count of un-coded bits in each pixel. The encoder circuitry 206 may be further configured to determine a quantization bin size of each pixel based on the Qn. For example, a pixel P in the encode 1D image block may have '5' un-coded bits (11100). The first pixel value of the pixel P may be determined as '28' (decimal equivalent of '11100'). As the count of un-coded bits is '5', the quantization bin size for the pixel P may be determined as $2^5$ i.e., 32.

In accordance with an embodiment, the encoder circuitry 206 may be further configured to determine a second pixel value for each pixel in the encoded 1D image block, based on the quantization bin size of each pixel. The second pixel value may be equal to half of the quantization bin size. For example, the second pixel value for the pixel P may be determined as '16' (half of 32). The encoder circuitry 206 may be further configured to determine an accumulated difference of the first pixel value and the second pixel value of each pixel in the encoded 1D image block. The encoder circuitry 206 may be further configured to calculate a first sum as a sum of the second pixel value of each pixel in the encoded 1D image block.

The encoder circuitry 206 may be further configured to determine a plurality of ranges based on the first sum. A reconstruction point of the plurality of reconstruction points may be associated with each range of the plurality of ranges. The extreme points of the plurality of ranges may be based on the first sum (represented as MAX). As an example, the plurality of ranges for '4' reconstruction points may be determined as a first range (−MAX to −3*MAX/4), a second range (−3*MAX/4 to 0), a third range (0 to 3*MAX/4), and a fourth range (3*MAX/4 to MAX). It should be noted that a count of the plurality of ranges may also change in accordance with a count of the plurality of reconstruction points. The encoder circuitry 206 may be further configured to determine a range of the plurality of ranges, in which the accumulated difference may lie. The encoder circuitry 206 may be further configured to select the reconstruction point from the plurality of reconstruction point, associated with the determined range.

In accordance with another embodiment, the encoder circuitry 206 may be further configured to calculate a first sum as a sum of the quantization bin size of each pixel in the encoded 1D image block. The encoder circuitry 206 may be further configured to calculate a second sum as a sum of the first pixel value of each pixel in the encoded 1D image block.

The encoder circuitry 206 may be further configured to determine a plurality of ranges based on the first sum. A reconstruction point of the plurality of reconstruction points may be associated with each range of the plurality of ranges. The extreme points of the plurality of ranges may be based on the first sum (represented as sumQ). As an example, the plurality of ranges for '4' reconstruction points may be determined as a first range (0 to sumQ/4), a second range (sumQ/4 to sumQ/2), a third range (sumQ/2 to 3*sumQ/4), and a fourth range (3*sumQ/4 to sumQ). The encoder circuitry 206 may be further configured to determine a range of the plurality of ranges, in which the second sum may lie. The encoder circuitry 206 may be further configured to select the reconstruction point from the plurality of reconstruction point, associated with the determined range.

The encoder circuitry 206 may be further configured to allocate a set of signaling bits in header information of a bit-stream 222 of the encoded 1D image block. The count of signaling bits may depend on the count of the plurality of reconstruction points. For example, 2 signaling bits may be allocated to represent '4' different reconstruction points. The set of signaling bits may indicate the selected reconstruction point, to the decoder circuitry 208.

With reference to FIG. 2B, there is also shown the second sequence of operations 224 at the decoding side. The bit-stream 222 of the encoded 1D image block may be stored in the memory, such as the external memory 110 or the on-chip memory 204. The decoder circuitry 208 may retrieve the bit-stream of the encoded 1D image block form the memory.

At 226, the bit-stream 222 may be decoded by application of a sequential decoding scheme (e.g., DPCM decoding and inverse quantization). The sequential decoding scheme may comprise inverse operations of the encoding operations executed to encode 1D image block. The decoder circuitry 208 may be configured to decode the bit-stream 222 of encoded 1D image block by application of a sequential decoding scheme based on the header information included in the bit-stream 222. The sequential decoding scheme may include sequential application of an inverse quantization and followed by a residual prediction decoding. The application of the sequential decoding scheme may generate a decoded 1D image block.

At 228, a refinement decoding scheme may be applied on the decoded 1D image block. The refinement decoding scheme may be an inverse operation of the refinement scheme executed by the encoder circuitry 206. The application of the refinement decoding scheme may result into generation of a refinement decoded 1D image block.

At 230, the pixel values of each pixel in the refinement decoded 1D image block may be reconstructed to generate a decoded image 232. The reconstructed pixel values may be based on the reconstruction point indicated by the set of signaling bits. The decoder circuitry 208 may be further configured to reconstruct the pixel values of each pixel in the refinement decoded 1D image block based on the reconstruction point indicated by the set of signaling bits.

For reconstruction, the decoder circuitry 208 may be further configured to determine a quantization bin associated with each pixel in the decoded 1D image block. The quantization bin may be a range of pixel values (such as 0 to 31, or 0 to 63). The decoder circuitry 208 may be further configured to determine the reconstruction point indicated by the set of signaling bits. A decoding table may be stored in the memory (such as the external memory 110 or the on-chip memory 204), which may establish a relationship between a set of signaling bits and the reconstruction point. The decoder circuitry 208 may be further configured to reconstruct the pixel value of each pixel based on the reconstruction point. The reconstructed pixel value may be equal to a value in the quantization bin, which correspond to the multiplication of the reconstruction point with the quantization bin size. For example, the reconstruction point may be determined as "0.125" for a first 1D image block and "0.625" for a second 1D image block. A first pixel in the first 1D image block with a quantization bin of 0 to 31, may be reconstructed as '4' (0+0.125*32), and a second pixel in the first 1D image block with a quantization bin of 0 to 63, may be reconstructed as '8' (0+0.125*64). Similarly, the first pixel in the second 1D image block with the quantization bin of 0 to 32, may be reconstructed as '20' (0+0.625*32), and a second pixel in the first 1D image block with a quantization bin of 0 to 63, may be reconstructed as '40' (0+0.625*64).

In certain embodiments, the encoder circuitry 206 may be configured to determine a quantization bin for multiple reconstruction points based quantization. The determined quantization bin may include a range of pixel values that may correspond to a visually more important area according to human visual system. In other words, a deviation from original pixel values corresponding to the quantization bin, may be more perceivable as compared to other quantization bins. The encoder circuitry 206 may be further configured to determine a quantization depth for each encoded 1D image block based on difference of the bit-depth and the quantization bin parameter (Qn). The encoder circuitry 206 may be further configured to determine a grey value for each encoded 1D image block based on the quantization depth. The grey value may be utilized as a decision factor to determine whether a pixel value corresponds to the quantization bin determined for multiple reconstruction points based quantization. In a case, it is determined that the pixel value corresponds to the quantization bin for multiple reconstruction, the decoder circuitry 208 may be configured to reconstruct the pixel value in accordance with the selected reconstruction point. Otherwise, the decoder circuitry 208 may be configured to reconstruct the pixel value in accordance with the middle reconstruction point.

In conventional reconstruction techniques at decoding stage, a single reconstruction point may be utilized for reconstruction of each encoded 1D image block, without taking into consideration a distribution of pixel values. Typically, a middle reconstruction point of a quantization bin is utilized to reconstruct the pixel values. In cases where, the encoded 1D image blocks have different ranges of pixel values (or there is large difference between the pixel values and the middle reconstruction point of the quantization bin), reconstruction using the middle reconstruction point may significantly increase the quantization error. In such cases, the reconstruction using the middle reconstruction point in each encoded 1D image block may degrade the subjective image quality.

As an example, a first "4×1" image block with quantization bin QB 0 to 31, may comprise pixel values P1=6, P2=6, P3=8, and P4=7. As all the pixel values belong to the quantization bin QB, the reconstruction of the first image block about the middle reconstruction point i.e., 16, may provide the reconstructed pixel values as RP1=16, RP2=16, RP3=16, RP4=16. The quantization error may be calculated as sum of absolute differences between the original and reconstructed pixel values. The quantization error for the first image block may be calculated as follows:

Quantization Error (QE1)=(16−6)+(16−6)+(16−8)+(16−7)=37.

A second "4×1" image block with the quantization bin QB 0 to 31, may comprise pixel values P1=28, P2=30, P3=26, and P4=26. As all the pixel values belong to the quantization bin QB, the reconstruction of the second image block about the middle reconstruction point i.e., 16, may provide the reconstructed pixel values as RP1=16, RP2=16, RP3=16, RP4=16. The quantization error for the second image block may be calculated as follows:

Quantization Error (QE2)=|16−28|+|16−30|+|16−26|+|16−26|=46.

Considering the same example and applying the multiple reconstruction points based quantization, the reconstruction points for the quantization bin QB (0 to 31) may be 4 (0.125*32), 12 (0.375*32), 20 (0.625*32), and 28 (0.875*32). The encoder circuitry 206 may be configured to select the reconstruction points as 4 and 28 for the first image block and the second image block respectively. The reconstructed values for the first image block may be RP1=4, RP2=4, RP3=4, and RP4=4. The quantization error for the first image block may be calculated as follows:

Quantization Error (QE1)=|4−6|+|4−6|+|4−8|+|4−7|=11.

The reconstructed values for the second image block may be RP1=28, RP2=28, RP3=28, and RP4=28. The quantization error for the second image block may be calculated as follows:

Quantization Error (QE2)=|28−28|+|28−30|+|28−26|+|28−26|=6.

The total quantization error (83 i.e. 37+46) for the middle reconstruction point based quantization is significantly higher than the total quantization error (17 i.e. 11+6) for the multiple reconstruction points based quantization. Thus, the reconstruction of the encode 1D image blocks, in accordance with an embodiment of the disclosure, may significantly reduce the quantization error and improve the visual image quality.

Figure 3A:
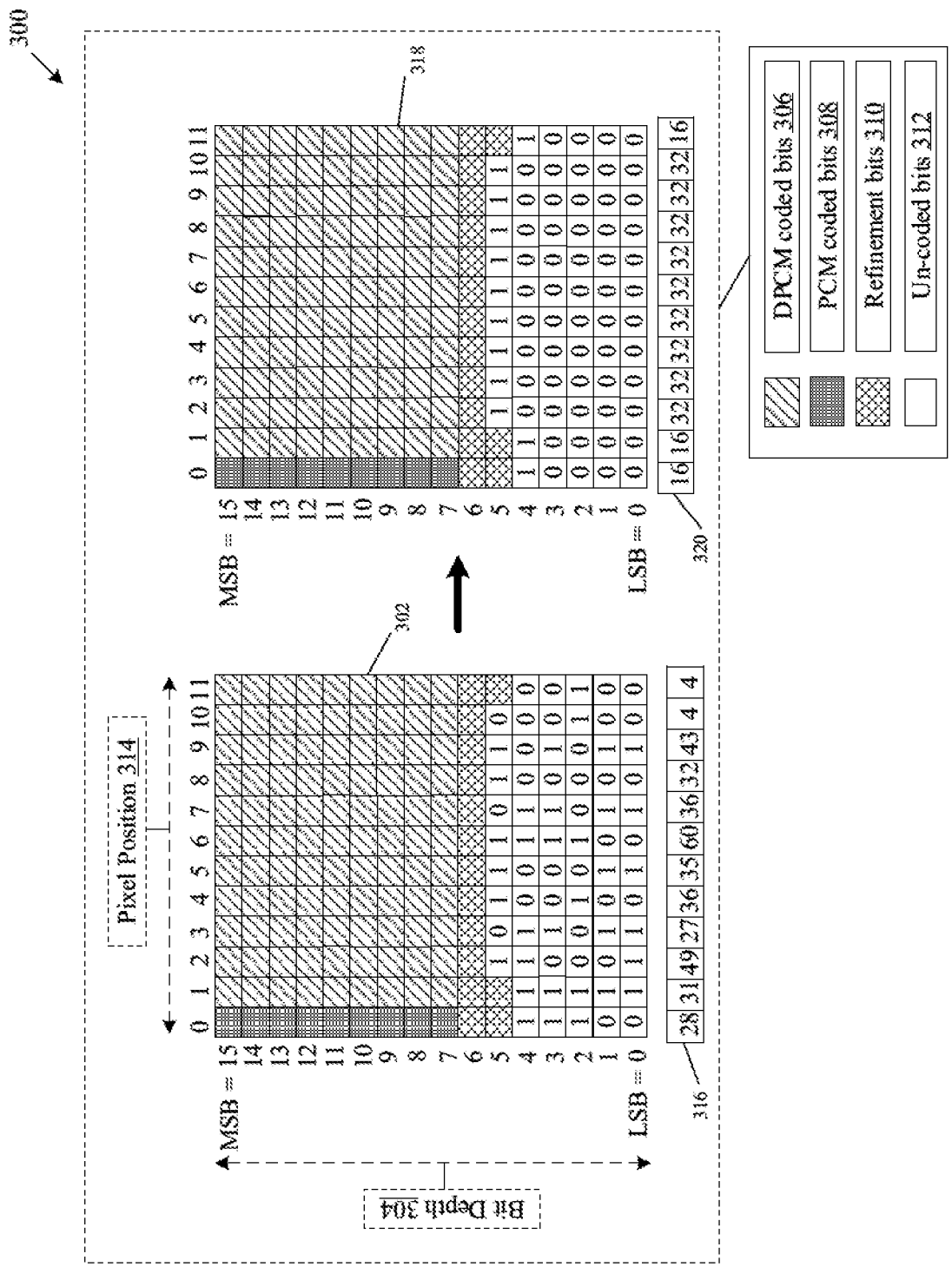
FIGS. 3A and 3B, collectively illustrate selection of an optimal reconstruction point, by the EBC circuitry of FIG. 2, in accordance with an embodiment of the disclosure.
Figure 3B:
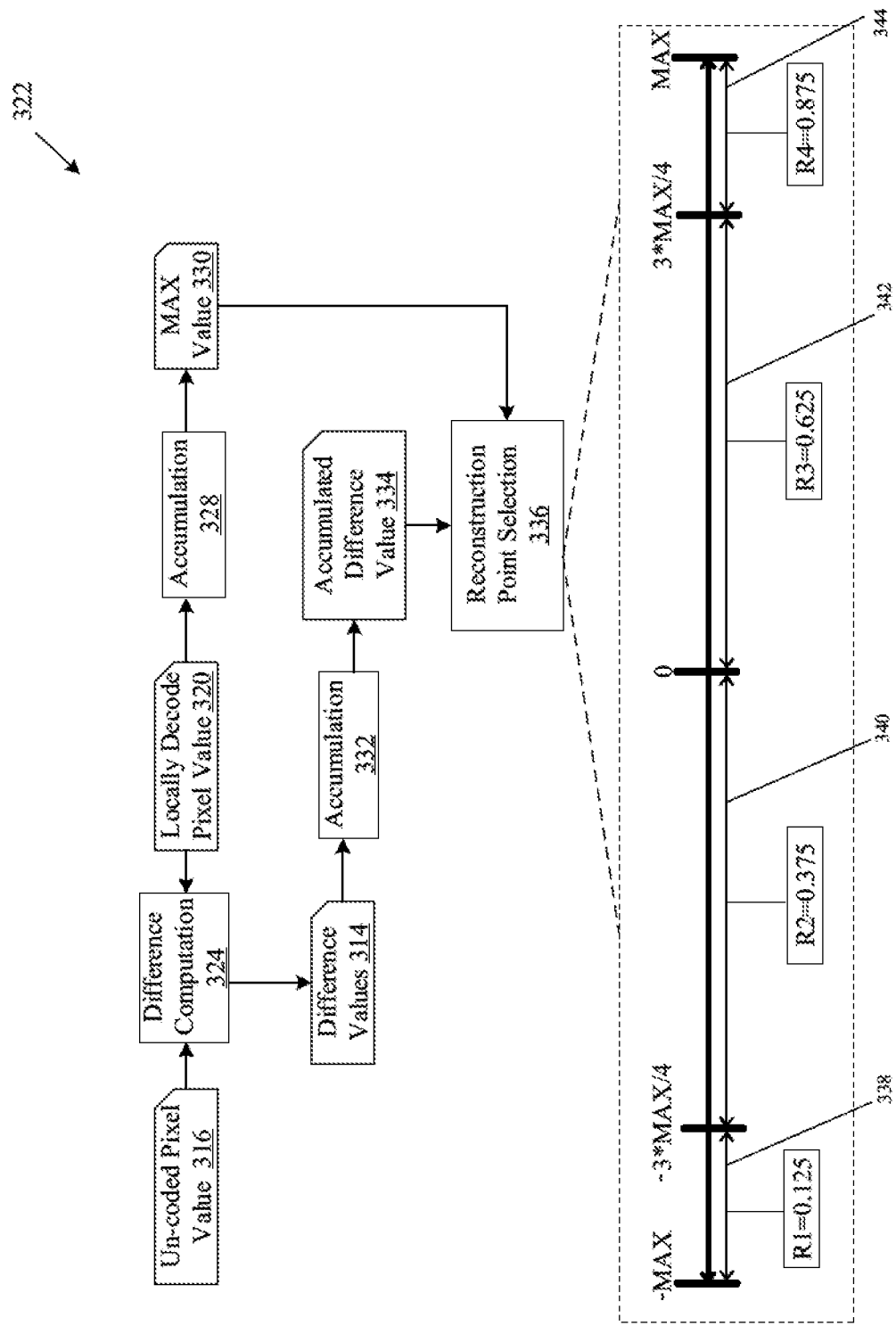

FIGS. 3A and 3B, collectively illustrates selection of an optimal reconstruction point, by the EBC circuitry of FIG. 2, in accordance with an embodiment of the disclosure. FIGS. 3A and 3B are explained in conjunction with elements from FIGS. 1, 2A, and 2B. With reference to FIG. 3A, there is shown a diagram 300. The diagram 300 describes a bit-plane representation of an encoded 1D image block obtained after a sequential application of quantization, a residual prediction, and followed by refinement on a 1D image block.

There is shown an encoded 1D image block 302 obtained after the sequential application of quantization, a residual prediction, and followed by refinement on a 1D image block. The encoded 1D image block 302 may have a bit-depth 304 of '16' bit-planes with the bit-plane "15" as a most significant bit-plane and the bit-plane "0" as a least significant bit-plane. The encoded 1D image block may comprise coded bits, such as DPCM coded bits 306, PCM coded bits 308, refinement bits 310, and un-coded bits 312, corresponding to each pixel position 314. The pixel at positions 0, 1, and 11 comprise un-coded bits 312 in the bit-planes 4 to 0. The pixel at positions 2 to 10 comprise un-coded bits 312 in the bit-planes 5 to 0.

The encoder circuitry 206 may be configured to determine an un-coded pixel value 316 corresponding to each pixel position based on a decimal equivalent of the un-coded bits 312. For pixel at position "0", the un-coded pixel value 316 may be determined as 28 ($2^4+2^3+2^2$). Similarly, for pixels at positions 1 to 11, the un-coded pixel value 316 may be determined as 31, 49, 27, 36, 35, 60, 36, 32, 43, 4, and 4, respectively.

There is also shown a locally decoded 1D image block 318 based on middle reconstruction point. The locally decoded 1D image block 318 comprises a binary bit "1" in a most significant bit-plane of the bit-planes that comprise the un-coded bits 312. The binary bit "1" at the most significant bit-plane corresponds to a middle reconstruction value of the pixels. For pixel at position "0", the quantization bin size is 32 (i.e. $2^5$). Accordingly, the middle reconstruction value is 16, which may be represented in binary as "10000". Thus, the bit-plane 4, at pixel positions 0, 1, and 11, comprises the binary bit "1", and the bit-plane 5, at pixel positions 2 to 10, comprises the binary bit "1". The encoder circuitry 206 may be configured to determine a decoded pixel value 320 corresponding to each pixel position in the locally decoded 1D image block 318. For pixels at positions 0 to 11, the decoded pixel value 320 may be determined as 16, 16, 32, 32, 32, 32, 32, 32, 32, 32, 32, and 16 respectively.

With reference to FIG. 3B, there is shown a diagram 322. The diagram 322 describes selection of a reconstruction point based on the un-coded pixel value 316 and the decoded pixel value 320.

At 324, the encoder circuitry 206 may be configured to calculate (or compute) a difference of the un-coded pixel value 316 and the decoded pixel value 320 for each pixel position 314 in the encoded 1D image block 302. This calculation may result into generation of difference values 326 corresponding to the encoded 1D image block 302. For example, the difference values 326 may be determined as 12, 15, 17, −5, 4, 3, 28, 4, 0, 11, −28, and −12 for the pixel at positions 0 to 11 respectively.

At 328, an accumulation operation may be executed. The encoder circuitry 206 may be further configured to accumulate the decoded pixel value 320 at each pixel position 314 of the locally decoded 1D image block 318. The accumulation of the decoded pixel value 320 may result into generation of a MAX value 330 corresponding to the encoded 1D image block 302. For example, the MAX value 330 for the encoded 1D image block 302 may be determined as "336".

At 332, the encoder circuitry 206 may be further configured to accumulate the difference values 326 for the encoded 1D image block 302. The accumulation of the difference values 326 may result into generation of an accumulated difference value 334 corresponding to the encoded 1D image block 302. For example, the accumulated difference value 334 for the encoded 1D image block 302 may be determined as "49".

At 336, the encoder circuitry 206 may be further configured to select a reconstruction point for the encoded 1 d image block 302 based on the MAX value 330 and the accumulated difference value 334. For this purpose, the encoder circuitry 206 may be further configured to determine a plurality of ranges, such as a range 338, a range 340, a range 342, and a range 344, based on a specified count of a plurality of reconstruction points. The count of the plurality of reconstruction points may be specified based on prior experimentations and/or user input. A reconstruction point, such as R1, R2, R3, or R4, may be associated with each range of the plurality of ranges. As an example, R1 may be associated with the range 338, R2 may be associated with the range 340, R3 may be associated with the range 342, and R4 may be associated with the range 344. The extreme points of each range may be determined based on the MAX value 330. For example, the plurality of ranges based on the MAX value 330 equal to "336" may be determined as (−336, −252), (−252, 0), (0, 252), and (252, 336).

It should be noted that the values of the reconstruction points R1, R2, R3, and R4 are shown as an example in a case when the count of reconstruction points is specified as '4'. The value of reconstruction points may also change with a change in the count of reconstruction points. For generalization purpose, the reconstruction points for "N" number of reconstruction points may be calculated as an arithmetic progression with first term as 1/2N and common difference as 1/N. The $i^{th}$ reconstruction point Ri may be calculated in accordance with the equation 1 as follows:

$$Ri = (1/2N) + (i-1)*(1/N) \qquad (1).$$

For example, for 5 reconstruction points, the reconstruction points may be calculated as 0.1, 0.3, 0.5, 0.7, and 0.9.

The encoder circuitry 206 may be further configured to a range of the plurality of ranges in which the accumulated difference value 334 lies. The encoder circuitry 206 may be further configured to select the reconstruction point associated with the range in which the accumulated difference value 334 lies. For example, the accumulated difference value 334 equal to "49" lies in the range 342 (i.e. 0 to 252), the encoder circuitry 206 may determine the reconstruction point as R3=0.625.

Figure 4A:
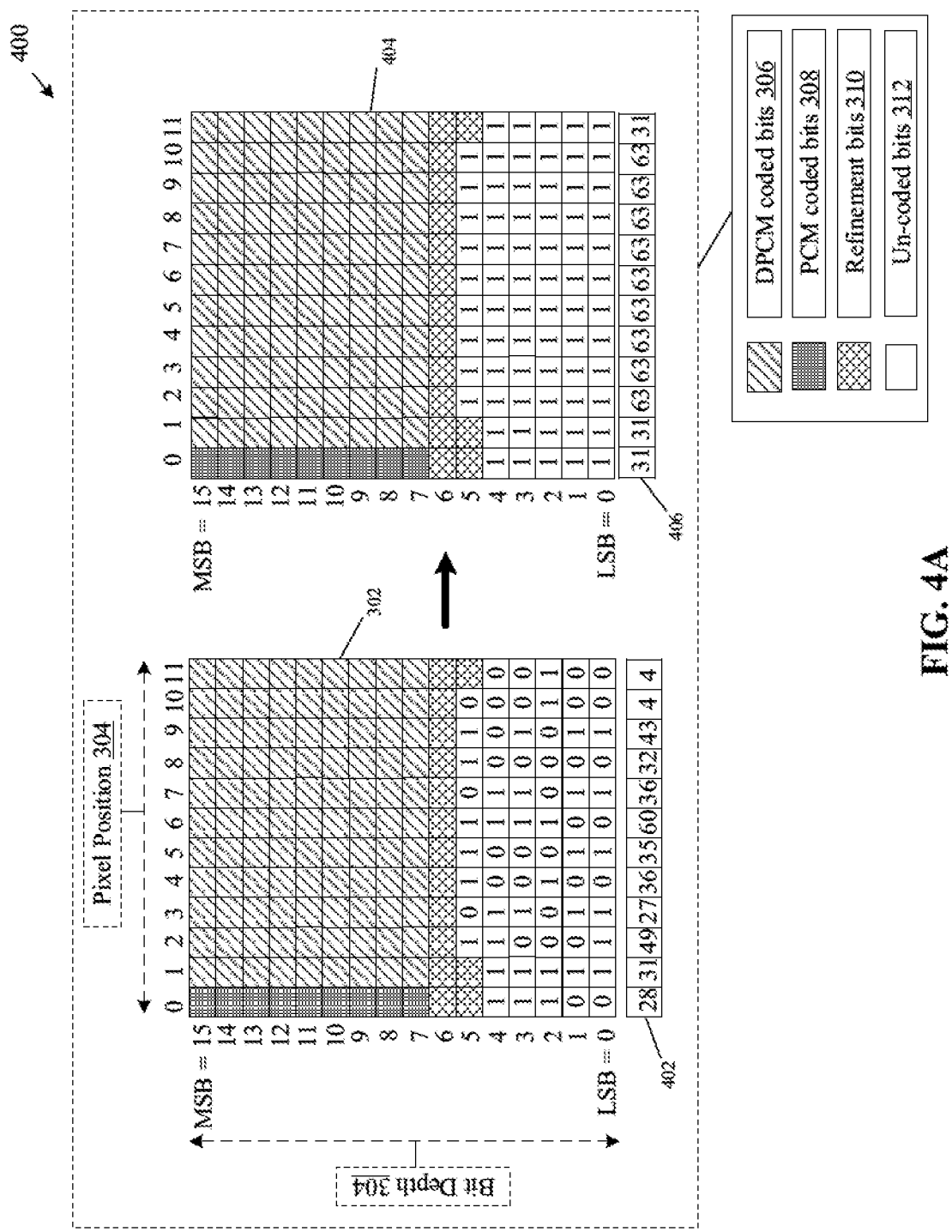
FIGS. 4A and 4B, collectively illustrate selection of an optimal reconstruction point, by the EBC circuitry of FIG. 2, in accordance with another embodiment of the disclosure.
Figure 4B:
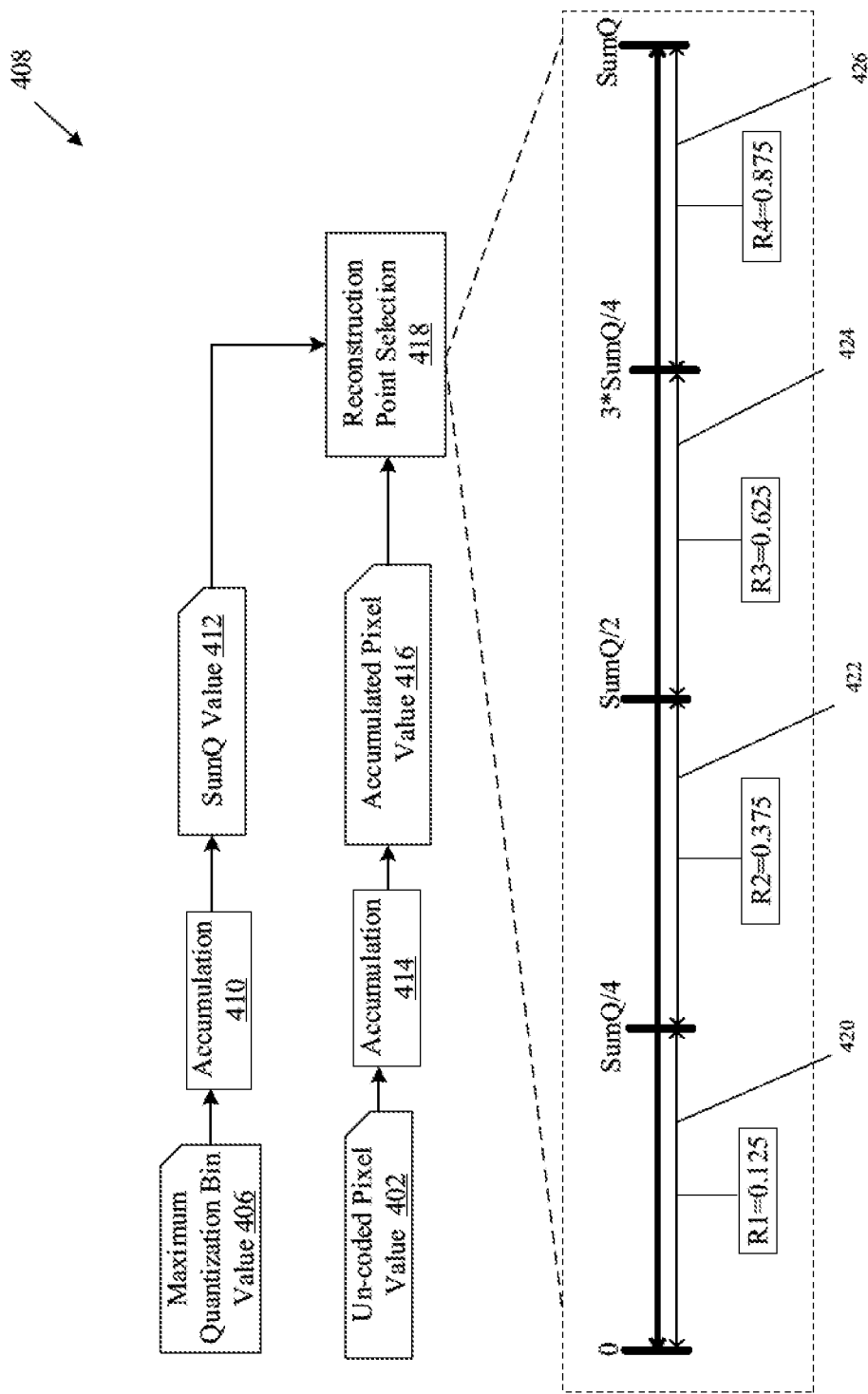

FIGS. 4A and 4B, collectively illustrates selection of an optimal reconstruction point, by the EBC circuitry of FIG. 2, in accordance with another embodiment of the disclosure. FIGS. 4A and 4B are explained in conjunction with elements from FIGS. 1, 2A, and 2B. With reference to FIG. 4A, there is shown a diagram 400. The diagram 400 describes a bit-plane representation of the encoded 1D image block obtained after a sequential application of quantization, a residual prediction, and followed by refinement on a 1D image block.

There is shown the encoded 1D image block 302 obtained after the sequential application of quantization, a residual prediction, and followed by refinement on the 1D image block. The encoder circuitry 206 may be configured to determine an un-coded pixel value 402 corresponding to each pixel position based on a decimal equivalent of the un-coded bits 312. For pixel at position "0", the un-coded pixel value 402 may be determined as 28 ($2^4+2^3+2^2$). Similarly, for pixels at positions 1 to 11, the un-coded pixel value 402 may be determined as 31, 49, 27, 36, 35, 60, 36, 32, 43, 4, and 4, respectively.

There is also shown an image block 404 based on a quantization bin size of the encoded 1D image block 302. The image block 404 comprises a binary bit "1" at each position of the un-coded bits 312 in the encoded 1D image block 302. The binary bit "1" at each position of the un-coded bits 312 corresponds to a maximum quantization bin value 406 of the pixels. The maximum quantization bin value may also be seen as the quantization bin size−1. For pixel at position "0", the quantization bin size is 32 (i.e. $2^5$) and the maximum quantization bin value 406 is 31 (i.e. 32−1). The encoder circuitry 206 may be configured to determine the maximum quantization bin value 406 corresponding to each pixel position in the image block 404. For pixels at positions 0 to 11, the maximum quantization bin value 406 may be determined as 31, 31, 63, 63, 63, 63, 63, 63, 63, 63, 63, and 31 respectively.

With reference to FIG. 4B, there is shown a diagram 408. The diagram 408 describes selection of a reconstruction point based on the un-coded pixel value 402 and the maximum quantization bin value 406.

At 410, the encoder circuitry 206 may be further configured to accumulate the maximum quantization bin value 406 at each pixel position 314 of the image block 402. The accumulation of the maximum quantization bin value 406 may result into generation of a SumQ value 412 corresponding to the encoded 1D image block 302. For example, the SumQ value 412 for the encoded 1D image block 302 may be determined as "663".

At 414, the encoder circuitry 206 may be further configured to accumulate un-coded pixel value 402 at each pixel position 314 of the encoded 1D image block 302. The accumulation of the un-coded pixel value 402 may result into generation of an accumulated pixel value 416 corresponding to the encoded 1D image block 302. For example, the accumulated pixel value 416 for the encoded 1D image block 302 may be determined as "385".

At 418, the encoder circuitry 206 may be further configured to select a reconstruction point for the encoded 1D image block 302 based on the SumQ value 412 and the accumulated pixel value 416. For this purpose, the encoder circuitry 206 may be further configured to determine a plurality of ranges, such as a range 420, a range 422, a range 424, and a range 426, based on a specified count of a plurality of reconstruction points. The count of the plurality of reconstruction points may be specified based on prior experimentations and/or user input. A reconstruction point, such as R1, R2, R3, or R4, may be associated with each range of the plurality of ranges. As an example, R1 may be associated with the range 420, R2 may be associated with the range 422, R3 may be associated with the range 424, and R4 may be associated with the range 426. The extreme points of each range may be determined based on the SumQ value 412. For example, the plurality of ranges based on the SumQ value 412 equal to "663" may be determined as (0, 167.75), (167.75, 331.5), (331.5, 503.25), and (503.25, 663). It should be noted that the values of the reconstruction points R1=0.125, R2=0.375, R3=0.625, and R4=0.875 are shown as an example in a case when the count of reconstruction points is specified as '4'. The value of reconstruction points may also change with a change in the count of reconstruction points.

The encoder circuitry 206 may be further configured to determine a range from the plurality of ranges (i.e., specified numeric ranges) in which the accumulated pixel value 416 lies. The encoder circuitry 206 may be further configured to select the reconstruction point associated with the range in which the accumulated pixel value 416 lies. For example, the accumulated pixel value 416 equal to "385" lies in the range 424 (i.e. 331.5 to 503.25), the encoder circuitry 206 may determine the reconstruction point as R3=0.625.

Figure 5A:
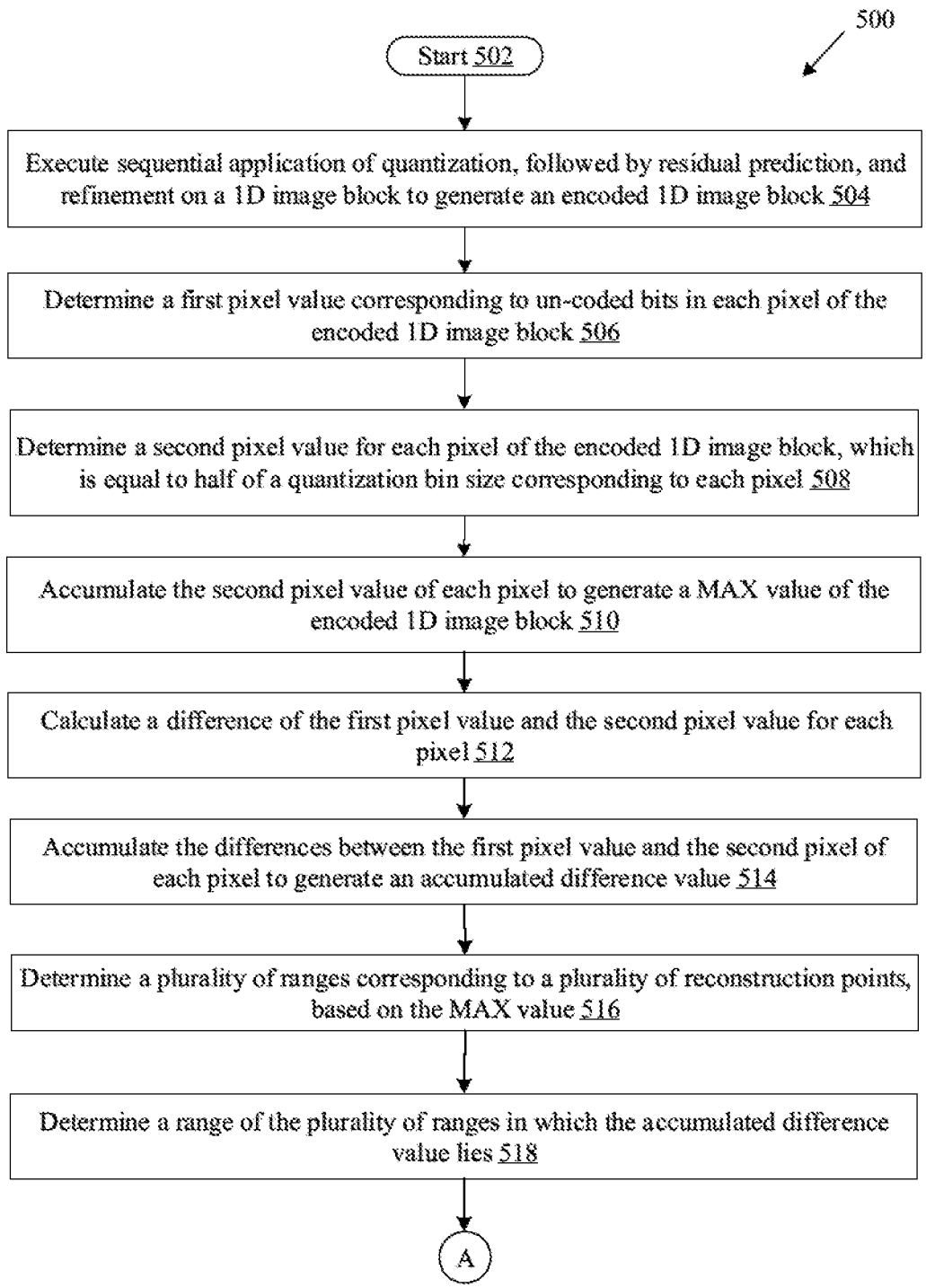
FIGS. 5A and 5B, collectively, is a flowchart that illustrates an exemplary method for multiple reconstruction points based quantization, in accordance with an embodiment of the disclosure.
Figure 5B:
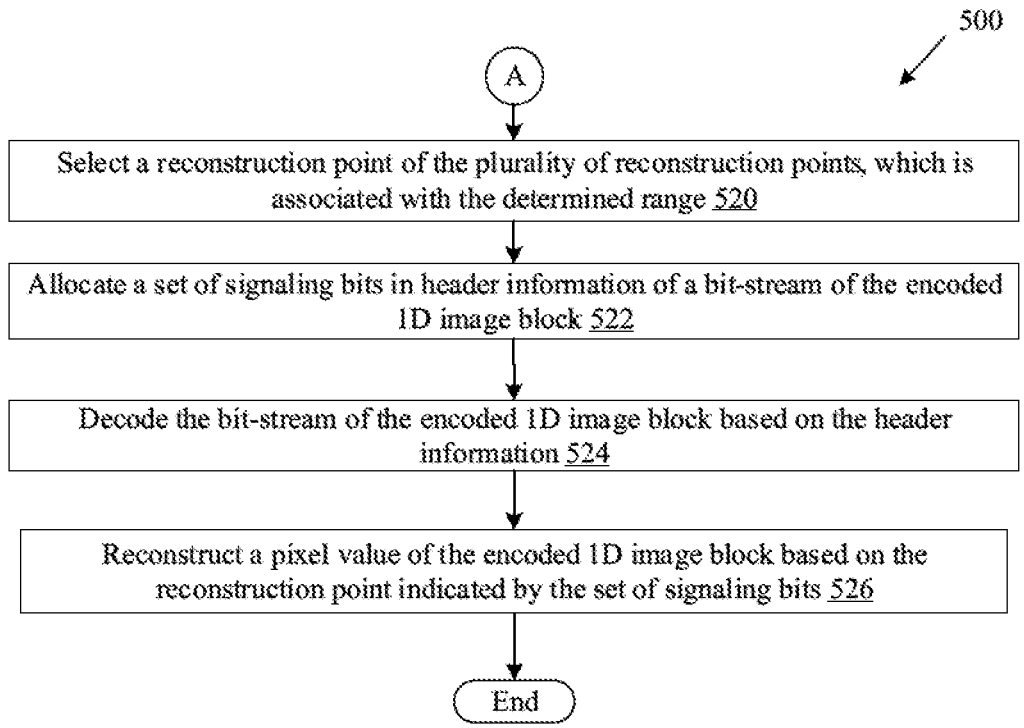

FIGS. 5A and 5B, collectively, depicts a flowchart that illustrates an exemplary method for multiple reconstruction points based quantization, in accordance with an embodiment of the disclosure. FIGS. 5A and 5B are explained in conjunction with elements from FIGS. 1, 2A, 2B, 3A, and 3B. With reference to FIGS. 5A and 5B, there is shown a flowchart 500 implemented in the EBC circuitry 108. The method starts at 502 and proceeds to 504.

At 504, a sequential application of quantization, followed by residual prediction, and refinement may be executed on a 1D image block to generate an encoded 1D image block. The encoded 1D image block may comprise coded bits and un-coded bits in a plurality of bit-planes. The encoder circuitry 206 may be configured to execute a sequential application of quantization, followed by residual prediction, and refinement on the 1D image block to generate the encoded 1D image block.

At 506, a first pixel value corresponding to the un-coded bits in each pixel of the encoded 1D image block may be determined. The first pixel value may be decimal equivalent of the un-coded bits. The encoder circuitry 206 may be configured to determine the first pixel value corresponding to the un-coded bits in each pixel of the encoded 1D image block.

At 508, a second pixel value for each pixel of the encoded 1D image block may be determined, which is equal to half of a quantization bin size corresponding to each pixel. The quantization bin size may be determined based on a quantization bin parameter that is equal to a count of bit-planes comprising the un-coded bits. The encoder circuitry 206 may be configured to determine the second pixel value for each pixel of the encoded 1D image block, which is equal to half of the quantization bin size corresponding to each pixel.

At 510, the second pixel value of each pixel may be accumulated to generate a MAX value of the encoded 1D image block. The encoder circuitry 206 may be configured to accumulate the second pixel value of each pixel to generate the MAX value of the encoded 1D image block.

At 512, a difference of the first pixel value and the second pixel value may be calculated for each pixel of the encoded 1D image block. The difference may correspond to a quantization error. The encoder circuitry 206 may be configured to calculate the difference of the first pixel value and the second pixel value for each pixel of the encoded 1D image block.

At 514, the difference between the first pixel value and the second pixel value of each pixel may be accumulated to generate an accumulated difference value of the encoded 1D image block. The encoder circuitry 206 may be configured to accumulate the difference between the first pixel value and the second pixel value of each pixel to generate an accumulated difference value of the encoded 1D image block.

At 516, a plurality of ranges corresponding to a plurality of reconstruction points may be determined based on the MAX value. Each range of the plurality of ranges may specify a range of values of the accumulated difference value. The encoder circuitry 206 may be configured to determine the plurality of ranges corresponding to the plurality of reconstruction points based on the MAX value.

At 518, a range of the plurality of ranges may be determined, in which the accumulated difference value of the encoded 1D image block lies. The encoder circuitry 206 may be configured to determine the range of the plurality of ranges in which the accumulated difference value of the encoded 1D image block lies.

At 520, a reconstruction point of the plurality of reconstruction points may be selected, which is associated with determined range. The encoder circuitry 206 may be configured to select the reconstruction point of the plurality of reconstruction points, which is associated with determined range.

At 522, a set of signaling bits may be allocated in header information of a bit-stream of the encoded 1D image block. The set of signaling bits may indicate the selected reconstruction point. The encoder circuitry 206 may be configured to allocate the set of signaling bits in header information of the bit-stream of the encoded 1D image block.

At 524, the bit-stream of the encoded 1D image block may be decoded based on the header information. The decoder circuitry 208 may be configured to decode the bit-stream of the encoded 1D image block based on the header information.

At 526, a pixel value for each pixel of the encoded 1D image block may be reconstructed based on the reconstruction point indicated by the set of signaling bits. The decoder circuitry 208 may be configured to reconstruct the pixel value for each pixel of the encoded 1D image block based on the reconstruction point indicated by the set of signaling bits. The control may pass to end.

Figure 6:
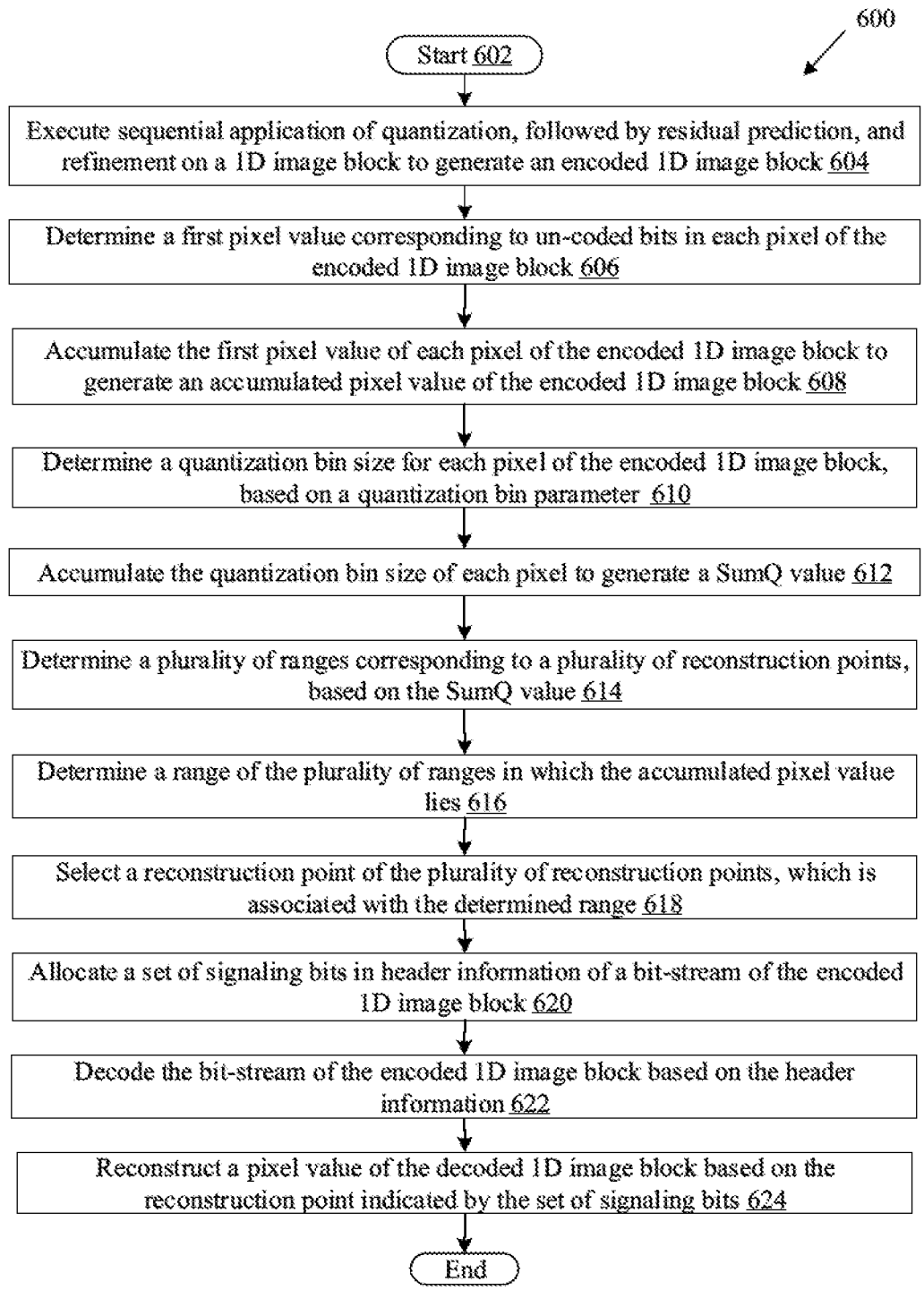
FIG. 6 is a flowchart that illustrates another exemplary method for multiple reconstruction points based quantization, in accordance with an embodiment of the disclosure.

FIG. 6 depicts a flowchart that illustrates another exemplary method for multiple reconstruction points based quantization, in accordance with an embodiment of the disclosure. FIG. 6 is explained in conjunction with elements from FIGS. 1, 2A, 2B, 4A, and 4B. With reference to FIG. 6, there is shown a flowchart 600 implemented in the EBC circuitry 108. The method starts at 602 and proceeds to 604.

At 604, a sequential application of quantization, followed by residual prediction, and refinement may be executed on a 1D image block to generate an encoded 1D image block. The encoded 1D image block may comprise coded bits and un-coded bits in a plurality of bit-planes. The encoder circuitry 206 may be configured to execute a sequential application of quantization, followed by residual prediction, and refinement on the 1D image block to generate the encoded 1D image block.

At 606, a first pixel value corresponding to the un-coded bits in each pixel of the encoded 1D image block may be determined. The first pixel value may be decimal equivalent of the un-coded bits. The encoder circuitry 206 may be configured to determine the first pixel value corresponding to the un-coded bits in each pixel of the encoded 1D image block.

At 608, the first pixel value of each pixel of the encoded 1D image block may be accumulated to generate an accumulated pixel value of the encoded 1D image block. The encoder circuitry 206 may be configured to accumulate the first pixel value of each pixel of the encoded 1D image block to generate the accumulated pixel value of the encoded 1D image block.

At 610, a quantization bin size may be determined for each pixel of the encoded 1D image block, based on a quantization bin parameter of each pixel. The quantization bin parameter may be equal to a count of bit-planes that comprises the un-coded bits. The encoder circuitry 206 may be configured to determine the quantization bin size for each pixel of the encoded 1D image block, based on the quantization bin parameter of each pixel.

At 612, the quantization bin size of each pixel may be accumulated to generate a SumQ value of the encoded 1D image block. The encoder circuitry 206 may be configured to accumulate the quantization bin size of each pixel to generate a SumQ value of the encoded 1D image block.

At 614, a plurality of ranges corresponding to a plurality of reconstruction points may be determined based on the SumQ value. Each range of the plurality of ranges may specify a range of values of the accumulated pixel value. The encoder circuitry 206 may be configured to determine the plurality of ranges corresponding to the plurality of reconstruction points based on the SumQ value.

At 616, a range of the plurality of ranges may be determined, in which the accumulated pixel value of the encoded 1D image block lies. The encoder circuitry 206 may be configured to determine the range of the plurality of ranges in which the accumulated pixel value of the encoded 1D image block lies.

At 618, a reconstruction point of the plurality of reconstruction points may be selected, which is associated with determined range. The encoder circuitry 206 may be configured to select the reconstruction point of the plurality of reconstruction points, which is associated with determined range.

At 620, a set of signaling bits may be allocated in header information of a bit-stream of the encoded 1D image block. The set of signaling bits may indicate the selected reconstruction point. The encoder circuitry 206 may be configured to allocate the set of signaling bits in header information of the bit-stream of the encoded 1D image block.

At 622, the bit-stream of the encoded 1D image block may be decoded based on the header information. The decoder circuitry 208 may be configured to decode the bit-stream of the encoded 1D image block based on the header information.

At 624, a pixel value for each pixel of the encoded 1D image block may be reconstructed based on the reconstruction point indicated by the set of signaling bits. The decoder circuitry 208 may be configured to reconstruct the pixel value for each pixel of the encoded 1D image block based on the reconstruction point indicated by the set of signaling bits. The control may pass to end.

Certain embodiments of the disclosure may be found in an embedded codec (EBC) circuitry (e.g., the EBC circuitry 108 (FIG. 1)). Various embodiments of the disclosure may provide the EBC circuitry that may include an encoder circuitry (e.g., the encoder circuitry 206 (FIG. 2)). The encoder circuitry may be configured to encode a one-dimensional (1D) image block by application of a sequential encoding scheme to generate an encoded 1D image block. The 1D image block may comprise a plurality of pixels, and the encoded 1D image block may comprise un-coded bits in a first plurality of bit-planes for each pixel of the plurality of pixels. A decimal equivalent of the un-coded bits may correspond to a first pixel value of each pixel of the plurality of pixels. The encoder circuitry may be further configured to determine a second pixel value of each pixel of the plurality of pixels in the encoded 1D image block, based on a quantization bin size of each pixel of the plurality of pixels. The second pixel value may be half of the quantization bin size. The quantization bin size may be based on a count of the first plurality of bit-planes. The encoder circuitry may be further configured to select a reconstruction point from a plurality of reconstruction points based on an accumulated difference of the first pixel value and the second pixel value of each pixel of the plurality of pixels. The encoder circuitry may be further configured to allocate a set of signaling bits that indicates the selected reconstruction point in a bit-stream of the encoded 1D image block. The EBC circuitry may further include a decoder circuitry (e.g., the decoder circuitry 208 (FIG. 2)). The decoder circuitry may be configured to reconstruct the first pixel value of each pixel of the plurality of pixels in the encoded 1D image block, based on the set of signaling bits. The reconstructed first pixel value may correspond to the reconstruction point indicated by the set of signaling bits In accordance with an embodiment, the encoder circuitry may be further configured to determine the quantization bin size of each pixel of the plurality of pixels based on a quantization bin parameter (Qn) of each pixel of the plurality of pixels. The Qn may be equal to the count of the first plurality of bit-planes.

In accordance with an embodiment, the encoder circuitry may be further configured to calculate a first sum by addition of the second pixel value of each pixel of the plurality of pixels. The encoder circuitry may be further configured to calculate a difference between the first pixel value and the second pixel value corresponding to each pixel of the plurality of pixels. The encoder circuitry may be further configured to calculate the accumulated difference by addition of the calculated difference between the first pixel value and the second pixel value corresponding to each pixel of the plurality of pixels. The encoder circuitry may be further configured to determine a plurality of ranges based on the first sum. Each range of the plurality of ranges may correspond to different reconstruction point of the plurality of reconstruction points. The encoder circuitry may be further configured to select a range of the plurality of ranges based on the accumulated difference. The accumulated difference may lie within the range. The encoder circuitry may be further configured to select, from the plurality of reconstruction points, the reconstruction point corresponding to the selected range.

In accordance with an embodiment, the encoder circuitry may be further configured to calculate a first sum by addition of the first pixel value of each pixel of the plurality of pixels. The encoder circuitry may be further configured to calculate a second sum by addition of the quantization bin size of each pixel of the plurality of pixels. The encoder circuitry may be further configured to determine a plurality of ranges based on the second sum. Each range of the plurality of ranges may correspond to different reconstruction point of the plurality of reconstruction points. The encoder circuitry may be further configured to select a range of the plurality of ranges based on the first sum that may lie within the range. The encoder circuitry may be further configured to select, from the plurality of reconstruction points, the reconstruction point corresponding to the selected range.

In accordance with an embodiment, the encoder circuitry may be further configured to determine a maximum quantization bin parameter (Qn) of the encoded 1D image block. The maximum Qn may correspond to a maximum count of first plurality of bit-planes in the encoded 1D image block. The encoder circuitry may be further configured to determine that the maximum Qn is greater than a threshold value. The encoder circuitry may be further configured to select the reconstruction point from the plurality of reconstruction points based on the determination that the maximum Qn is greater than the threshold value. The encoder circuitry may be further configured to determine that the maximum Qn is less than a threshold value. The encoder circuitry may be further configured to select the reconstruction point as half of the quantization bin size based on the determination that the maximum Qn is less than the threshold value.

In accordance with an embodiment, the encoder circuitry may be further configured to determine a grey value of the encoded 1D image block based on a bit-depth of the encoded 1D image block and a quantization bin parameter (Qn) of the encoded 1D image block. The encoder circuitry may be further configured to determine that a quantization coefficient of the encoded 1D image block is equal to the grey value. The encoder circuitry may be further configured to determine that the count of the first plurality of bit-planes is less than the threshold value. The encoder circuitry may be further configured to determine the plurality of reconstruction points based on the determination that the quantization coefficient of the encoded 1D image block is equal to the grey value.

In accordance with an embodiment, the encoder circuitry may be further configured to execute the sequential encoding scheme on the 1D image block to generate the bit-stream of the encoded 1D image block. The bit-stream may comprise header information that indicates the sequential encoding scheme. The sequential encoding scheme may comprise a sequential application of a quantization scheme, followed by a residual prediction scheme, and a refinement scheme on the 1D image block. The residual prediction scheme may be a differential pulse code modulation (DPCM) scheme.

In accordance with an embodiment, the decoder circuitry may be further configured to decode the bit-stream of the encoded 1D image block by application of a sequential decoding scheme, based on header information of the bit-stream. The sequential decoding scheme may comprise a sequential application of an inverse quantization scheme, followed by a residual prediction decoding scheme, a refinement decoding scheme, and the reconstruction of the first pixel value In accordance with an embodiment, the reconstruction point may correspond to a normalized value between 0 to 1, and wherein the reconstructed first pixel value of a pixel of the plurality of pixels is equal to multiplication of the reconstruction point with the quantization bin size of the pixel.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features enabling the implementation of the methods described herein, and which when loaded in a computer system is able to carry out these methods. Computer program, in the present context, means any expression, in any language, code or notation, of a set of instructions intended to cause a system having an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. An embedded codec (EBC) circuitry, comprising:
encoder circuitry configured to:
encode a one-dimensional (1D) image block by application of a sequential encoding scheme to generate an encoded 1D image block,
the 1D image block comprises a plurality of pixels, and the encoded 1D image block comprises un-coded bits in a first plurality of bit-planes for each pixel of the plurality of pixels, and
a decimal equivalent of the un-coded bits corresponds to a first pixel value of each pixel of the plurality of pixels;
determine a second pixel value of each pixel of the plurality of pixels in the encoded 1D image block, based on a quantization bin size of each pixel of the plurality of pixels,
the second pixel value is half of the quantization bin size, and
the quantization bin size is based on a count of the first plurality of bit-planes;
select a reconstruction point from a plurality of reconstruction points based on an accumulated difference of the first pixel value and the second pixel value of each pixel of the plurality of pixels; and
allocate a set of signaling bits that indicates the selected reconstruction point in a bit-stream of the encoded 1D image block; and
decoder circuitry configured to:
reconstruct the first pixel value of each pixel of the plurality of pixels in the encoded 1D image block, based on the set of signaling bits, wherein the reconstructed first pixel value corresponds to the reconstruction point indicated by the set of signaling bits.

2. The EBC circuitry according to claim 1, wherein the encoder circuitry is further configured to determine the quantization bin size of each pixel of the plurality of pixels based on a quantization bin parameter (Qn) of each pixel of the plurality of pixels, and
the Qn is equal to the count of the first plurality of bit-planes.

3. The EBC circuitry according to claim 1, wherein the encoder circuitry is further configured to:
calculate a first sum by addition of the second pixel value of each pixel of the plurality of pixels;
calculate a difference between the first pixel value and the second pixel value corresponding to each pixel of the plurality of pixels; and
calculate the accumulated difference by addition of the calculated difference between the first pixel value and the second pixel value corresponding to each pixel of the plurality of pixels.

4. The EBC circuitry according to claim 3, wherein the encoder circuitry is further configured to:
determine a plurality of ranges based on the first sum, wherein each range of the plurality of ranges corresponds to a different reconstruction point of the plurality of reconstruction points;
select a range of the plurality of ranges based on the accumulated difference, wherein the accumulated difference lies within the range; and
select, from the plurality of reconstruction points, the reconstruction point corresponding to the selected range.

5. The EBC circuitry according to claim 1, wherein the encoder circuitry is further configured to:
calculate a first sum by addition of the first pixel value of each pixel of the plurality of pixels; and
calculate a second sum by addition of the quantization bin size of each pixel of the plurality of pixels.

6. The EBC circuitry according to claim 5, wherein the encoder circuitry is further configured to:
determine a plurality of ranges based on the second sum, wherein each range of the plurality of ranges corresponds to different reconstruction point of the plurality of reconstruction points;

select a range of the plurality of ranges based on the first sum, wherein the first sum lies within the range; and
select, from the plurality of reconstruction points, the reconstruction point corresponding to the selected range.

7. The EBC circuitry according to claim 1, wherein
the encoder circuitry is further configured to determine a maximum quantization bin parameter (Qn) of the encoded 1D image block, and
the maximum Qn corresponds to a maximum count of first plurality of bit-planes in the encoded 1D image block.

8. The EBC circuitry according to claim 7, wherein the encoder circuitry is further configured to:
determine that the maximum Qn is greater than a threshold value; and
select the reconstruction point from the plurality of reconstruction points based on the determination that the maximum Qn is greater than the threshold value.

9. The EBC circuitry according to claim 7, wherein the encoder circuitry is further configured to:
determine that the maximum Qn is less than a threshold value; and
select the reconstruction point as half of the quantization bin size based on the determination that the maximum Qn is less than the threshold value.

10. The EBC circuitry according to claim 1, wherein the encoder circuitry is further configured to:
determine a grey value of the encoded 1D image block based on a bit-depth of the encoded 1D image block and a quantization bin parameter (Qn) of the encoded 1D image block;
determine that a quantization coefficient of the encoded 1D image block is equal to the grey value; and
determine the plurality of reconstruction points based on the determination that the quantization coefficient of the encoded 1D image block is equal to the grey value.

11. The EBC circuitry according to claim 1, wherein
the encoder circuitry is further configured to execute the sequential encoding scheme on the 1D image block to generate the bit-stream of the encoded 1D image block, and
the bit-stream comprises header information that indicates the sequential encoding scheme.

12. The EBC circuitry according to claim 11, wherein
the sequential encoding scheme comprises a sequential application of a quantization scheme, followed by a residual prediction scheme, and a refinement scheme on the 1D image block, and
the residual prediction scheme is a differential pulse code modulation (DPCM) scheme.

13. The EBC circuitry according to claim 1, wherein the decoder circuitry is further configured to decode the bit-stream of the encoded 1D image block by application of a sequential decoding scheme, based on header information of the bit-stream.

14. The EBC circuitry according to claim 13, wherein the sequential decoding scheme comprises a sequential application of an inverse quantization scheme, followed by a residual prediction decoding scheme, a refinement decoding scheme, and the reconstruction of the first pixel value.

15. The EBC circuitry according to claim 1, wherein
the reconstruction point corresponds to a normalized value between 0 to 1, and
the reconstructed first pixel value of a pixel of the plurality of pixels is equal to multiplication of the reconstruction point with the quantization bin size of the pixel.

16. A method, comprising:
in an embedded codec (EBC) circuitry that comprises encoder circuitry and decoder circuitry:
encoding, by the encoder circuitry, a one-dimensional (1D) image block by application of a sequential encoding scheme to generate an encoded 1D image block,
the 1D image block comprises a plurality of pixels, and wherein the encoded 1D image block comprises un-coded bits in a first plurality of bit-planes in each pixel of the plurality of pixels, and
a decimal equivalent of the un-coded bits corresponds to a first pixel value of each pixel of the plurality of pixels;
determining, by the encoder circuitry, a second pixel value of each pixel of the plurality of pixels in the encoded 1D image block, based on a quantization bin size of each pixel of the plurality of pixels, wherein
the second pixel value is half of the quantization bin size, and
the quantization bin size is based on a count of the first plurality of bit-planes;
selecting, by the encoder circuitry, a reconstruction point from a plurality of reconstruction points based on an accumulated difference of the first pixel value and the second pixel value of each pixel of the plurality of pixels;
allocating, by the encoder circuitry, a set of signaling bits that indicates the selected reconstruction point in a bit-stream of the encoded 1D image block; and
reconstructing, by the decoder circuitry, the first pixel value of each pixel of the plurality of pixels in the encoded 1D image block, based on the set of signaling bits, wherein the reconstructed first pixel value corresponds to the reconstruction point indicated by the set of signaling bits.

17. The method according to claim 16, further comprising determining, by the encoder circuitry, the quantization bin size of each pixel of the plurality of pixels based on a quantization bin parameter (Qn) of each pixel of the plurality of pixels, wherein the Qn is equal to the count of the first plurality of bit-planes.

18. The method according to claim 16, further comprising:
calculating, by the encoder circuitry, a first sum by addition of the second pixel value of each pixel of the plurality of pixels;
calculating, by the encoder circuitry, a difference between the first pixel value and the second pixel value corresponding to each pixel of the plurality of pixels; and
calculating, by the encoder circuitry, the accumulated difference by addition of the calculated difference between the first pixel value and the second pixel value corresponding to each pixel of the plurality of pixels.

19. The method according to claim 18, further comprising:
determining, by the encoder circuitry, a plurality of ranges based on the first sum, wherein each range of the plurality of ranges corresponds to different reconstruction point of the plurality of reconstruction points;

selecting, by the encoder circuitry, a range of the plurality of ranges based on the accumulated difference, wherein the accumulated difference lies within the range; and selecting, by the encoder circuitry, from the plurality of reconstruction points, the reconstruction point corresponding to the selected range.

20. The method according to claim 16, further comprising determining, by the encoder circuitry, a maximum bin quantization parameter (Qn) of the encoded 1D image block, wherein the maximum Qn corresponds to a maximum count of first plurality of bit-planes in the encoded 1D image block.

* * * * *